United States Patent
Dowd et al.

(10) Patent No.: US 9,660,477 B2
(45) Date of Patent: May 23, 2017

(54) MOBILE CHARGING UNIT FOR INPUT DEVICES

(71) Applicant: Adobe Systems Incorporated, San Jose, CA (US)

(72) Inventors: Geoffrey Dowd, San Francisco, CA (US); Sang Ik Lee, Walnut Creek, CA (US)

(73) Assignee: Adobe Systems Incorporated, San Jose, CA (US)

( * ) Notice: Subject to any disclaimer, the term of this patent is extended or adjusted under 35 U.S.C. 154(b) by 454 days.

(21) Appl. No.: 13/841,089

(22) Filed: Mar. 15, 2013

(65) Prior Publication Data

US 2014/0266026 A1  Sep. 18, 2014

(51) Int. Cl.
*H02J 7/02* (2016.01)
*H02J 7/00* (2006.01)
*G06F 1/26* (2006.01)

(52) U.S. Cl.
CPC ............ *H02J 7/025* (2013.01); *H02J 7/0044* (2013.01); *H02J 7/0054* (2013.01); *G06F 1/263* (2013.01); *H02J 2007/0062* (2013.01)

(58) Field of Classification Search
CPC .............................. H02J 7/0044; H02J 7/0052
USPC ....................................................... 320/108
See application file for complete search history.

(56) References Cited

U.S. PATENT DOCUMENTS

| | | |
|---|---|---|
| D294,263 S | 2/1988 | Rodgers et al. |
| D327,476 S | 6/1992 | Valls et al. |
| D342,652 S | 12/1993 | Wensley et al. |
| 5,973,677 A * | 10/1999 | Gibbons .................. 345/179 |
| D419,043 S | 1/2000 | Staton |
| D419,541 S | 1/2000 | Kawashima |

(Continued)

FOREIGN PATENT DOCUMENTS

| | | |
|---|---|---|
| EP | 21464141 A1 * | 7/2009 |
| WO | 9320536 A1 | 10/1993 |
| WO | WO9320536 A1 * | 10/1993 |

OTHER PUBLICATIONS

Non-Final Office Action dated May 7, 2015 in U.S. Appl. No. 13/856,070, 13 pages.

(Continued)

*Primary Examiner* — Samuel Berhanu
*Assistant Examiner* — Tessema Kebede
(74) *Attorney, Agent, or Firm* — Shook, Hardy & Bacon, L.L.P.

(57) ABSTRACT

Devices, methods, and systems for charging input devices. A charging unit includes a sleeve for receiving a stylus and a base. The charging unit receives electrical power from an external power source via an interface and transfers the power to the stylus via a connection between the base's charging contacts and conductive charging zones on a portion of the input device in the base. A method detects insertion of a stylus into a charging unit having an internal battery and an interface capable of receiving power from an external power source. The method determines if the unit is connected to a power source. If so, the stylus is charged by transferring the received energy via a connection between the unit's charging contacts and conductive charging zones of the stylus. If energy is not being received from the external power source, the method charges the stylus using the unit's internal battery.

20 Claims, 11 Drawing Sheets

(56) References Cited

U.S. PATENT DOCUMENTS

| | | | |
|---|---|---|---|
| D433,888 S | 11/2000 | Choi | |
| D457,402 S | 5/2002 | Heck et al. | |
| D472,924 S | 4/2003 | Pan | |
| 6,563,494 B1 | 5/2003 | Eichstaedt et al. | |
| 6,648,536 B1 | 11/2003 | Bellue | |
| D522,579 S | 6/2006 | Sim | |
| D523,709 S | 6/2006 | Knox | |
| D537,309 S | 2/2007 | Wang | |
| D547,141 S | 7/2007 | Shan | |
| D557,086 S | 12/2007 | Lipscomb et al. | |
| D585,489 S | 1/2009 | Han | |
| D615,588 S | 5/2010 | Hillemann | |
| D615,589 S | 5/2010 | Hillemann | |
| D628,031 S | 11/2010 | Stokes et al. | |
| D628,032 S | 11/2010 | Stokes et al. | |
| D630,067 S | 1/2011 | Block et al. | |
| D640,106 S | 6/2011 | Molina et al. | |
| D641,755 S | 7/2011 | Rashid et al. | |
| D642,032 S | 7/2011 | Molina et al. | |
| D681,038 S | 4/2013 | Tomohiro | |
| 8,438,640 B1 | 5/2013 | Vaish et al. | |
| 8,841,881 B2 * | 9/2014 | Failing | B60L 3/00 307/65 |
| 8,878,823 B1 * | 11/2014 | Kremin et al. | 345/179 |
| 2001/0001430 A1 | 5/2001 | Ely et al. | |
| 2003/0097410 A1 | 5/2003 | Atkins et al. | |
| 2006/0001654 A1 | 1/2006 | Smits | |
| 2006/0101064 A1 | 5/2006 | Strong et al. | |
| 2006/0108976 A1 * | 5/2006 | Chen | 320/108 |
| 2006/0291701 A1 | 12/2006 | Tanaka | |
| 2007/0143379 A1 | 6/2007 | i Dalfo et al. | |
| 2007/0174246 A1 | 7/2007 | Sigurdsson et al. | |
| 2008/0046425 A1 | 2/2008 | Perski | |
| 2008/0169132 A1 | 7/2008 | Ding et al. | |
| 2008/0189659 A1 | 8/2008 | Krutzler | |
| 2009/0175491 A1 | 7/2009 | Charpentier | |
| 2009/0204681 A1 | 8/2009 | Sun | |
| 2009/0244015 A1 | 10/2009 | Sengupta et al. | |
| 2009/0251432 A1 | 10/2009 | Wang et al. | |
| 2009/0287841 A1 | 11/2009 | Chapweske et al. | |
| 2010/0021022 A1 * | 1/2010 | Pittel et al. | 382/123 |
| 2010/0079404 A1 | 4/2010 | Degner et al. | |
| 2010/0131675 A1 | 5/2010 | Pan | |
| 2010/0164434 A1 * | 7/2010 | Cacioppo et al. | 320/115 |
| 2010/0216107 A1 | 8/2010 | Hines | |
| 2010/0289812 A1 | 11/2010 | Kobayashi et al. | |
| 2010/0318534 A1 | 12/2010 | Kaufman et al. | |
| 2011/0279081 A1 * | 11/2011 | Cacioppo et al. | 320/108 |
| 2011/0316472 A1 * | 12/2011 | Han et al. | 320/103 |
| 2012/0079578 A1 | 3/2012 | Dachiraju et al. | |
| 2012/0105362 A1 | 5/2012 | Kremin et al. | |
| 2012/0226983 A1 | 9/2012 | Goldenberg et al. | |
| 2013/0106722 A1 | 5/2013 | Shahparnia et al. | |
| 2013/0141456 A1 | 6/2013 | Sokolov et al. | |
| 2013/0154956 A1 | 6/2013 | Tudosoiu | |
| 2013/0234999 A1 | 9/2013 | Kuno | |
| 2013/0257793 A1 | 10/2013 | Zeliff et al. | |
| 2013/0278550 A1 | 10/2013 | Westhues | |
| 2014/0188978 A1 | 7/2014 | Ng et al. | |
| 2014/0253467 A1 | 9/2014 | Hicks et al. | |
| 2014/0253469 A1 | 9/2014 | Hicks et al. | |

OTHER PUBLICATIONS

Non-Final Office Action dated Mar. 3, 2015 in U.S. Appl. No. 29/467,046, 6 pages.
Notice of Allowance dated May 21, 2015 in U.S. Appl. No. 29/467,046, 5 pages.
Non-Final Office Action dated Sep. 18, 2014 in U.S. Appl. No. 13/835,959, 21 pages.
Final Office Action dated Feb. 12, 2015 in U.S. Appl. No. 13/835,959, 23 pages.
Notice of Allowance dated Sep. 5, 2013 in U.S. Appl. No. 29/453,913, 9 pages.
WSJ Staff; Samsung Unveils Tablet, Readies Phone; The Wall Street Journal; Digits Technology News and Insights; Feb. 25, 2013; 4 pages.
http://www.tenonedesign.com/connect.php; last accessed on Apr. 3, 2013.
Notice of Allowance dated Aug. 31, 2015 in U.S. Appl. No. 13/855,997, 5 pages.
Final Office Action dated Nov. 12, 2015 in U.S. Appl. No. 13/856,070, 15 pages.
Final Office Action dated Nov. 12, 2015 in U.S. Appl. No. 13/840,746, 26 pages.
Final Office Action dated Nov. 27, 2015 in U.S. Appl. No. 13/839,441, 22 pages.
Non-Final Office Action dated May 4, 2015 in U.S. Appl. No. 13/855,997, 12 pages.
First Action Interview Pre-Interview Communication dated Jun. 26, 2015 in U.S. Appl. No. 13/840,746, 6 pages.
Internet Article, Review: Samsung Galaxy Note 10.1 tablet is mightier with pen—CNN.com, Harry McCracken, 3 pgs., Aug. 17, 2012 http://cpf.cleanprint.net/cpd/cpf?action=print&type=filePrint&key=cnn&url=http%3A%2F.
Non-Final Office Action dated Jun. 20, 2014 in U.S. Appl. No. 13/572,231, 19 pages.
Final Office Action dated Nov. 6, 2014 in U.S. Appl. No. 13/572,231, 21 pages.
Non-Final Office Action dated Mar. 5, 2015 in U.S. Appl. No. 13/572,231, 21 pages.
First Action Interview Pre-Interview Communication dated Jul. 1, 2015 in U.S. Appl. No. 13/839,441, 7 pages.
Notice of Allowance dated Jul. 8, 2015 in U.S. Appl. No. 13/572,231, 8 pages.
Notice of Allowance dated Jun. 14, 2016 in U.S. Appl. No. 13/839,441, 10 pages.
Final Office Action dated Jul. 28, 2016 in U.S. Appl. No. 13/840,746, 29 pages.
Non-Final Office Action dated Aug. 10, 2016 in U.S. Appl. No. 13/835,959, 25 pages.
Notice of Allowance dated Mar. 7, 2016 in U.S. Appl. No. 13/856,070, 5 pages.
Non-Final Office Action dated Mar. 22, 2016 in U.S. Appl. No. 13/840,746, 31 pages.
Non-Final Office Action dated Mar. 22, 2016 in U.S. Appl. No. 13/839,441, 31 pages.
Final Office Action dated Feb. 27, 2017 in U.S. Appl. No. 13/835,959, 17 pages.

\* cited by examiner

MOBILE CHARGING UNIT FOR INPUT DEVICES

TECHNICAL FIELD

This disclosure relates generally to electronic computing devices and more particularly relates to mobile charging units for input devices used with touch screen computing devices.

BACKGROUND

Conventional touch screen computing devices have been configured to identify the positioning and/or movement of one or more fingers or other objects on or near touch surfaces of the devices. For example, certain touch screen computing devices can receive input from a stylus. A stylus is a writing, drawing, or pointing instrument or utensil that is generally configured to be hand held and, in the context of touch screen computing devices, used to interact with a touch surface. For example, touch screen computing devices have identified input based on one end of the stylus moving on or near the touch surface of the computing device. Styli (or styluses) have been used with personal digital assistant devices, tablet computing devices, smart phones, and other touch screen computing devices for handwriting, drawing, selecting icons, and providing other forms of input to such touch computing devices.

There are three general categories of stylus devices: active styli, pressure sensitive styli, and 'dumb' styli. Dumb styli have no internal electronic components, no batteries, and typically only have a capacitive rubber tip at an end of a pen-shaped body. Active styli are self-contained systems designed to work with specific, usually proprietary, touch computing devices. Active styli may include radios or other means to communicate with a particular touch device/platform and are typically limited to working with a proprietary touch screen interface of a closed, proprietary system. This is because active styli are typically designed to be used with a particular tablet device. Such active styli are constrained to working with a given platform because other, third party touch computing platforms and devices will not recognize these closed-system styli as valid input devices.

In contrast to active styli, pressure sensitive styli are often designed to work with third party touch screens and touch computing devices not made by the manufacturer of such styli. Example pressure sensitive styli are described in more detail in U.S. patent application Ser. No. 13/572,231 entitled "Multifunctional Stylus", filed Aug. 10, 2012, which is incorporated by reference herein in its entirety. Pressure sensitive styli may include a wireless transceiver or other means for wirelessly communicating with touch computing devices. Some styli include a light emitting diode (LED) or other means to indicate that the stylus is powered on or communicating with a touch device. Wireless styli with such internal electronics require their own, internal power supply. Prior solutions involved incorporating user-replaceable batteries, such as AAA and AAAA-sized cells, into styli. However, the relatively large size and weight of replaceable batteries result in larger and heavier styli. Use of cylindrical replaceable batteries such as AAA and AAAA cells requires that stylus bodies be wider than traditional writing and drawing instruments, such as pens and pencils, which do not ergonomically enhance their use as styli and may cause discomfort during extended periods of use.

In order to address the size and weight issues implicit in use of traditional replaceable batteries, some styli are powered by relatively smaller, captive batteries. Because such captive batteries are not user-replaceable, these styli must be periodically recharged. Prior solutions for stylus charging include using a wired connection between a stylus and a power supply via a plug, port, or receptacle built into the stylus or including magnetic materials in the stylus so that the stylus can be magnetically coupled to a power supply. Another charging technique for mobile devices is inductive charging using inductive coupling between an inductive charging station and a device having a battery to be charged. Such inductive charging requires inclusion of an induction coil within the device whose battery is being recharged. Some inductive coupling techniques use magnets and magnetic material within a device to be charged to ensure that the device remains in close enough proximity to the charging station to be inductively charged. Each of these charging technologies and techniques have the drawbacks of adding size and weight to the devices being charged, thus making them less aesthetically pleasing and not ergonomically enhancing their use as styli. In addition, incorporating magnetic materials and induction coils into styli can interfere with certain electronic components contained within some styli, such as wireless transceivers.

Styli can be susceptible to damage from mechanical impulse forces, particularly pressure-sensitive styli whose tips include pressure-sensitive elements. Pressure sensitive styli seek to provide many different levels of pressure sensitivity, which can be useful in drawing, graphics, and other touch-based applications. Such pressure sensitivity can be achieved via use of pressure sensitive tips and sensors, which can include relatively small moving parts and sensitive components. Traditional techniques for limiting damage to styli include inserting them into a desktop dock or base, covering their tips with stylus-specific caps, or placing them in a case when not in use. The dual needs for recharging and damage prevention are compounded in mobile environments where a power supply and protective docks or cases may not be readily available.

SUMMARY

Disclosed herein are apparatuses, methods, and systems for charging an input device, such as a stylus, using a mobile charging unit configured to accept an electrical charge from a power source and subsequently transfer the charge to the input device via charging contacts.

The charging unit includes a sleeve with an opening that the stylus can be inserted into. The charging unit also includes a base attached to the sleeve. The base can connect to an external power source via an interface and includes charging contacts for transferring power to a stylus. The charging unit charges the stylus when the stylus is inserted into the unit such that an electrical connection is formed between the charging contacts and charging zones of a conductive surface of the stylus.

According to one exemplary embodiment, a mobile charging apparatus includes a sleeve portion adapted to receive an input device via a first opening at a first end of the sleeve portion and a base portion removably coupled to a second end of the sleeve portion, the second end having a second opening. The base portion has charging contacts and is configured to accept electrical power from an external power source via an interface and charge a rechargeable battery of the input device through an electrical connection between the charging contacts and charging zones of a conductive surface of the input device.

In another exemplary embodiment, a method for charging a rechargeable battery of a stylus includes detecting insertion of a stylus into a housing of a charging unit having an internal battery and an interface capable of receiving electrical power from an external power source. The method determines whether the charging unit is connected to an external power source or no and then determines an amount of power stored in the charging unit's internal battery. If it is determined that the charging unit is not connected to an external power source and that the charging unit's internal battery has sufficient power to charge the stylus, the rechargeable battery of the stylus is charged from the charging unit's internal battery. Otherwise, if it is determined that the charging unit is connected to an external power source and the charging unit's internal battery unit lacks sufficient power to charge the stylus, the stylus's rechargeable battery is charged using power received from the external power source via the interface.

In yet another exemplary embodiment, a system for charging a stylus includes a power source adapted to transmit electrical power via an interface and a charging unit having an elongate housing an elongate housing having an opening adapted to receive a stylus and a mechanical coupling mechanism adapted to secure the received stylus within the housing. The charging unit also has charging contacts adapted to transfer electrical current via an electrical connection to charging zones of a conductive surface of the stylus received via the opening and secured within the housing by the mechanical coupling mechanism. The charging unit further includes a port or receptacle capable of receiving the electrical power from the power source via the interface. The charging unit is configured to detect coupling of the stylus received via the opening, receive electrical power from the external power source via the interface, and charge the received stylus by transferring electrical power received via the interface to a rechargeable battery of the stylus via an electrical connection between the charging contacts and charging zones of a conductive surface of the stylus.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented. The structure and operation of various embodiments are described in detail below with reference to the accompanying drawings. Such embodiments are presented herein for illustrative purposes only. Additional embodiments will be apparent to persons skilled in the relevant art(s) based on the teachings contained herein.

BRIEF DESCRIPTION OF THE FIGURES

Exemplary embodiments are best understood from the following detailed description when read in conjunction with the accompanying drawings. It is emphasized that, according to common practice, the various features of the drawings are not to scale. On the contrary, the dimensions of the various features may be arbitrarily expanded or reduced for clarity. Included in the drawings are the following figures.

Figure 1A:
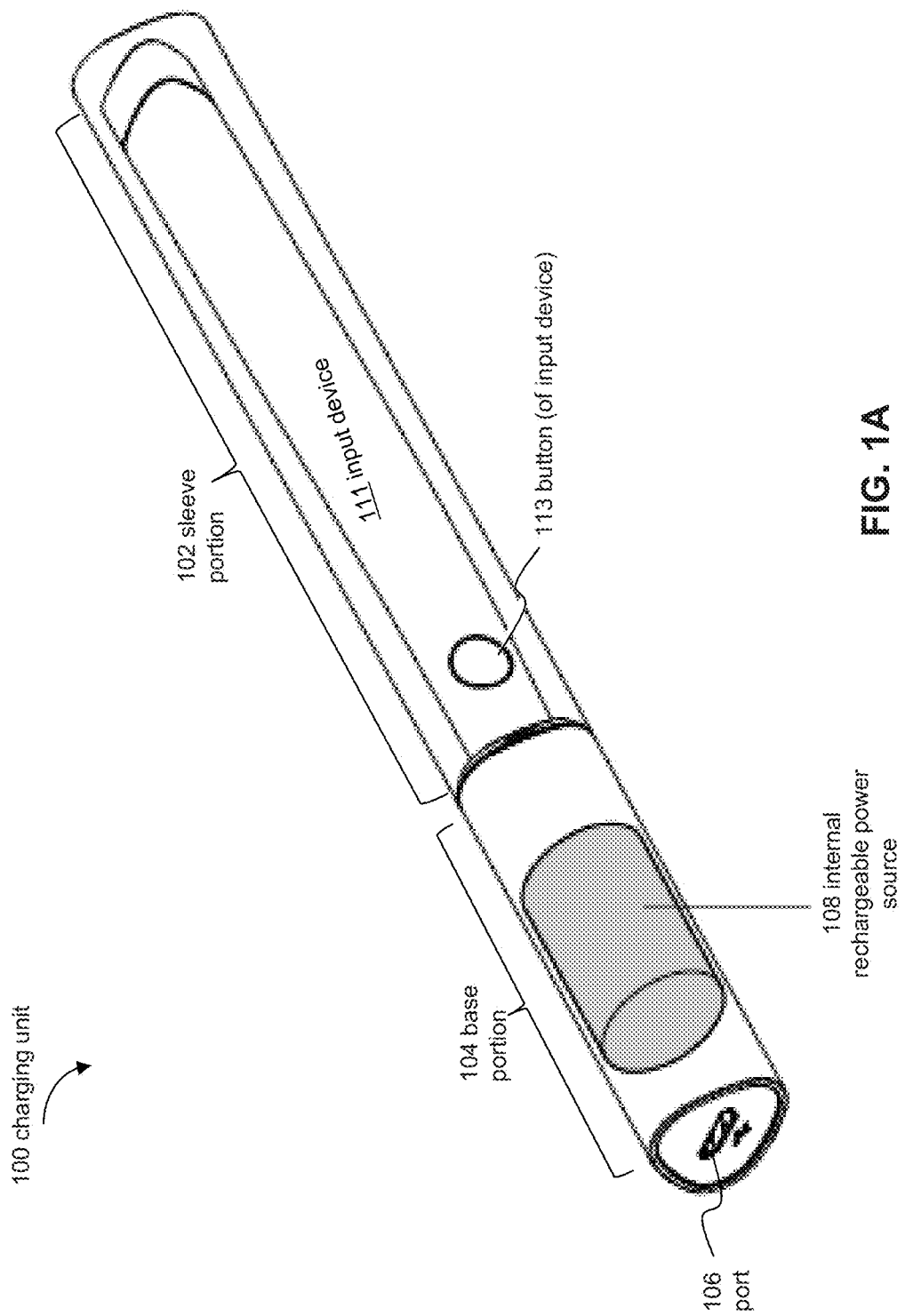
FIG. 1A is a perspective view of a mobile charging unit for an input device, according to certain embodiments.

Embodiments of the present invention will now be described with reference to the accompanying drawings. In the drawings, generally, common or like reference numbers indicate identical or functionally similar elements. Additionally, generally, the left-most digit(s) of a reference number identifies the drawing in which the reference number first appears.

DETAILED DESCRIPTION

Apparatuses, methods and systems are disclosed for charging an input device, such as a multifunctional stylus, while also protecting the input device from damage due to mechanical forces. The input device includes a rechargeable battery or other suitable energy storage device and functions as a device for interacting with one or more touch computing devices. The stylus includes a body and a tip at one end, the tip being configured to interact with a touch surface of a computing device. A mobile charging apparatus or unit is adapted to receive electrical power from an external power source and charge a rechargeable battery of an input device. The charging unit charges the input device via an electrical connection between charging contacts of the unit and a conductive surface of the input device. As used herein, the term "conductive" refers to a property of any object or material that is capable of conducting energy. In embodiments, a conductive surface of an input device is any surface that is electrically conductive. For example, a conductive surface can refer to any surface comprising a material which permits the flow of electric charges through it. Non-limiting examples of conductive materials include metallic and metal conductors such as, but not limited to, brass, copper, and aluminum. In an embodiment, one or more of the charging contacts can be spring mounted. In accordance with embodiments, the charging unit receives electrical power from an external power source via an interface. In certain embodiments, the interface is a Universal Serial Bus (USB) and the charging unit includes a receptacle, such as a Micro USB port, capable of receiving electrical power (i.e., energy) from the external power source via a USB cable.

In a non-limiting embodiment, a base portion of a charging unit comprises a cavity facing an opening of a sleeve portion of the charging unit. The cavity has positive and negative (or ground) charging contacts. A portion of an input device, such as the end of a stylus having a tip and an adjacent conductive surface, can be inserted into the cavity so that the charging contacts are electrically connected to respective charging zones of the conductive surface. The charging unit includes a mechanical coupling mechanism configured to secure the end of an inserted input device so that positive and negative charging contacts are in physical contact with respective positive and negative charging zones of the input device's conductive surface. The mechanical coupling can include a groove or indentation within the sleeve or the cavity designed to accept a snap-in connection from an external ring or protrusion on the input device. Alternatively, the mechanical coupling can comprise a tab, ring, or other protrusion inside the sleeve or in a cavity of the body portion configured to snap into a groove or indentation on an external surface of the input device, such as a body or nozzle portion of a stylus. The mechanical coupling can comprise nonconductive semi rigid materials such as plastics. As used herein, the term "nonconductive" refers to a property of any object or material whose internal electric charges do not flow freely, and which therefore does not conduct an electric current, under the influence of an electric field. In embodiments, a nonconductive material is any material useable as an electrical insulator. For example, a nonconductive material can refer to any a material having a sufficiently high resistivity to be usable as an electrical insulator for voltages produced by electrical components and/or batteries of the charging unit and the input device. Non-limiting examples of nonconductive materials include electrical insulators and plastics such as acrylonitrile butadiene styrene (ABS) plastic. The protrusions of the mechanical coupling can incorporate spring-mounted elements configured to secure an end of an input device inserted into the cavity.

The charging unit may also function as a protective housing or sleeve for protecting a stylus inserted into the unit. The sleeve, in combination with a charging base portion, can function to protect a stylus and its tip from mechanical forces, such as an impulse force applied to the unit. An embodiment of the mobile charging unit protects a stylus inserted within it by incorporating a sleeve adapted to receive and protect the body of the stylus and an attached base for protecting the stylus tip. In certain embodiments, one or more outer layers of the charging unit's sleeve and/or base can comprise cushioning materials configured to limit the transmission of impulse forces between outer surfaces of the sleeve and base and an input device within the unit. In an embodiment, the sleeve and base are encased in a single housing having one or more outer layers comprising shock absorbing, cushioning materials. Non-limiting examples of such cushioning materials include fabrics such as felt, and synthetic rubber coatings such as neoprene and polychloroprene. In one embodiment, an outer layer of the base comprises a shock absorbing material, such as silicone rubber. The shock absorbing material can be configured to compress or deform in response to a mechanical force applied to the outer layer of the base. In embodiments, an outer layer of the base and/or sleeve portions is made of materials that protect a stylus within the charging unit from mechanical forces applied to the charging unit. Embodiments of the charging unit can be configured to absorb external mechanical and/or acceleration forces applied to it when it (and the input device within it) is dropped, flexed, or twisted. For example, as discussed below with reference to FIGS. 2A, 2B, and 5, one or more outer layers of the housing can include flexible, cushioning, and/or shock absorbing materials such as, but not limited to, fabric (i.e., felt), polychloroprene (i.e., neoprene), silicone rubber, and leather.

Additionally, the charging unit may include an internal rechargeable power source configured to store electrical power received via an interface with an external power source, the internal rechargeable power source having sufficient storage capacity to recharge the rechargeable battery of the input device one or more times without needing connectivity to an external power source.

In an exemplary embodiment, a mobile charging apparatus includes a housing with an opening for receiving an input device, a charging head or base with charging contacts and an internal, rechargeable power source, such as a rechargeable battery, configured to store energy received as electrical power via an interface with an external power source. The internal, rechargeable power source has a sufficient storage capacity to recharge an input device, such as a stylus, one or more times without requiring a connection to an external power source. The input device includes its own rechargeable power source. For example, the input device may use a rechargeable battery within its body as a power source. The charging head or base of the mobile charging apparatus can also include a computer readable storage medium with executable instructions or logic for indicating a status via a light emitting diode (LED) of the stylus. The logic can be encoded into circuitry such as one or more integrated circuits (ICs) on a printed circuit board (PCB). For example, the logic can be encoded in an application-specific IC (ASIC). The logic is executable by a processor, such as a microprocessor chip included in the circuitry on the PCB. When executed, the logic determines a status, such as a charging status or a battery status, and indicates the determined status via the LED. Non-limiting examples of such indications include, alternating between partially and fully illuminating the LED to pulsate it when the stylus is being charged from the external power source, blinking the LED off and on in red when the stylus is charging from an internal rechargeable power source of the charging apparatus (i.e., an internal battery), fully illuminating the LED (i.e., at maximum brightness) when the stylus is fully charged, and turning off the LED when the stylus is not charging. Other indications, such as a predetermined number of iterations of rapidly turning the LED off and on, can be used to convey that the rechargeable battery of the stylus is substantially depleted. According to embodiments, at least a portion of the charging apparatus housing is translucent or transparent so that the LED of a stylus inserted into the apparatus for charging, remains visible. In another embodiment, opening of the housing is configured such that stylus LED remains visible through the opening when the stylus is inserted into the mobile charging apparatus.

According to further exemplary embodiments, an inductive mobile charging unit includes an induction coil to inductively couple with an inductive charging coil of an external power source so that the unit can receive energy wirelessly from the inductive charging coil in the form of electromagnetic waves. The inductive charging unit is configured to convert such received energy to electrical current and use the current to charge an internal rechargeable power source that stores energy corresponding to the received current. In an embodiment, the unit's internal rechargeable power source is a rechargeable battery. When an input device, such as a stylus, is inserted into a sleeve portion of the unit such that an electrical connection is made between charging contacts in a base portion of the unit and charging zones of a conductive surface of the input device, the energy stored in the unit's internal rechargeable power source is used to charge a rechargeable battery in the input device.

In one example, the charging unit includes an LED and a computer readable storage medium having logic encoded thereon, that when executed by a processor, causes the processor to determine and indicate, via the charging unit's LED, one or more of a battery status for an input device's battery, a status for the unit's internal rechargeable power source (i.e., a battery status for an internal battery of the unit), a charging status for the input device, and a charging status for the unit's battery. In response to determining a charging status, the logic can include instructions to indicate, via the LED or other suitable communications means, a charging status such as, but not limited to, charging from an external power source, charging the input device's battery from the unit's internal battery, and not charging. Other indications, such as a predetermined number of iterations of rapidly turning the LED off and on, can be used to convey that the internal battery of the charging apparatus and/or a rechargeable battery of the stylus are substantially depleted. Additional indications can communicate that the internal battery is being charged by the external power source. Similarly, in response to determining a battery status, the logic can include instructions to convey, via the unit's LED, a battery status, for the unit's internal battery or the input device's battery.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific logic or instructions generated by a compiler and/or an interpreter from code written in any suitable computer-programming language, including, for example, C, C++, C#, Visual Basic, Java, Python, Perl, JavaScript, and ActionScript.

As used herein, the term "input device" refers to any device usable to interact with an interface of a computing device. An input device may be one or more of a keyboard, a microphone, or a pointing/drawing device such as a mouse or stylus. Input devices can be configured to interact with a touch-sensitive interface of a computing device, such as a touch surface or a touch-sensitive display. As used herein, a "stylus" refers to any writing, drawing, or pointing instrument or utensil that is generally configured to be hand held and, in the context of touch screen computing devices, used to interact with a computing device having a touch-sensitive interface or touch surface (i.e., a touch computing device). A stylus can include a body and a tip at one end, and the tip can be configured to interact with a touch surface of a touch computing device. The terms "input device" and "stylus" are used interchangeably herein to refer broadly and inclusively to any type of input device capable of interacting with a touch computing device.

As used herein, the term "computing device" refers to any computing or other electronic equipment that executes instructions and includes any type of processor-based equipment that operates an operating system or otherwise executes instructions. A computing device will typically include a processor that executes program instructions and may include external or internal components such as a mouse, a CD-ROM, DVD, a keyboard, a display, or other input or output equipment. Examples of computing devices are personal computers, digital assistants, personal digital assistants, mobile phones, smart phones, pagers, tablet computers, laptop computers, Internet appliances, other processor-based devices, gaming devices, and television viewing devices. Exemplary computing devices 322B, 322C, 322D, and 700 shown in FIGS. 3 and 7 can be respectively used as special purpose computing devices to provide specific functionality offered by their respective applications and by the interaction between their applications.

Figure 3:
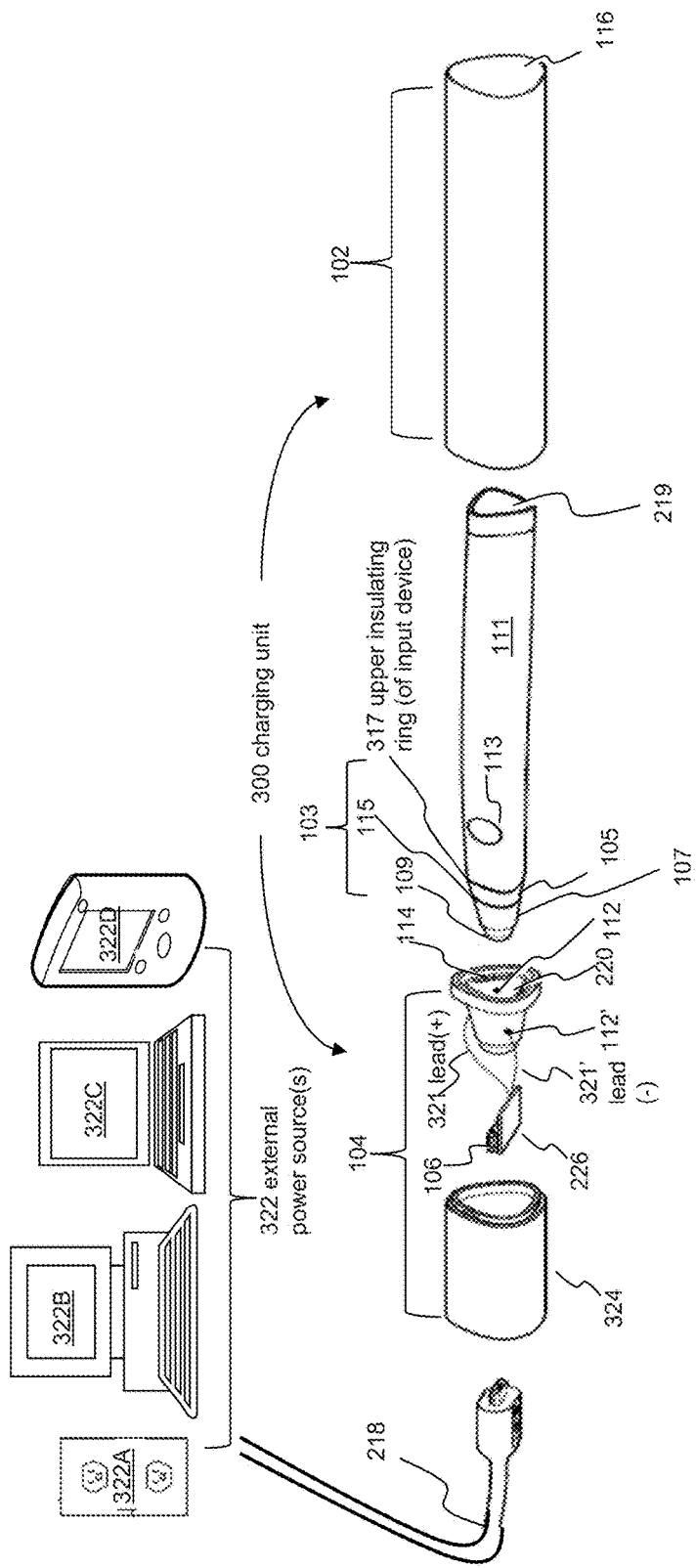
FIG. 3 is a diagram depicting components of an exemplary charging unit for charging an input device.
Figure 7:
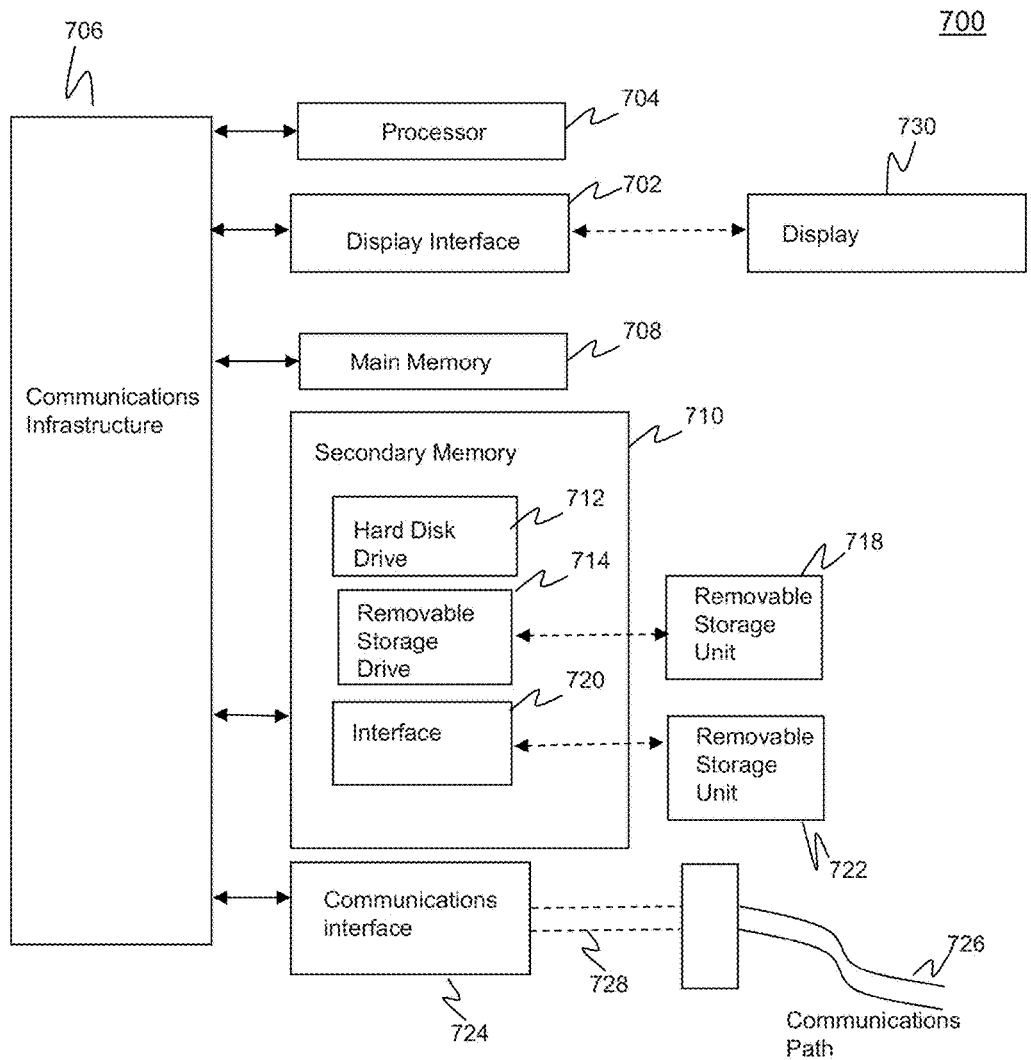
FIG. 7 is a diagram of an exemplary computer system in which embodiments of the present disclosure can be implemented.

As used herein, the term "application" refers to any program instructions or other functional components that execute on a computing device. An application may reside in the memory of a device that executes the application. As is known to one of skill in the art, such applications may be resident in any suitable computer-readable medium and execute on any suitable processor. For example, as shown in FIG. 3, the charging unit 300 includes a computer-readable medium as part of its circuitry 226. With reference to FIG. 7, the computer readable medium can be main memory 708 and secondary memory 710 coupled to a processor 704 that executes computer-executable program instructions and/or accesses stored information. Such a processor 704 may comprise a microprocessor, an ASIC, a state machine, or other processor, and can be any of a number of computer processors. Such processors include, or may be in communication with, a computer-readable medium which stores instructions that, when executed by the processor, cause the processor to perform the steps described herein.

These illustrative examples are given to introduce the reader to the general subject matter discussed here and are not intended to limit the scope of the disclosed concepts. The following sections describe various additional embodiments and examples with reference to the drawings in which like numerals indicate like elements. For brevity, only the differences occurring within the Figures, as compared to previous or subsequent ones of the figures, are described below.

Exemplary Conductive Charging Unit

Figure 1B:
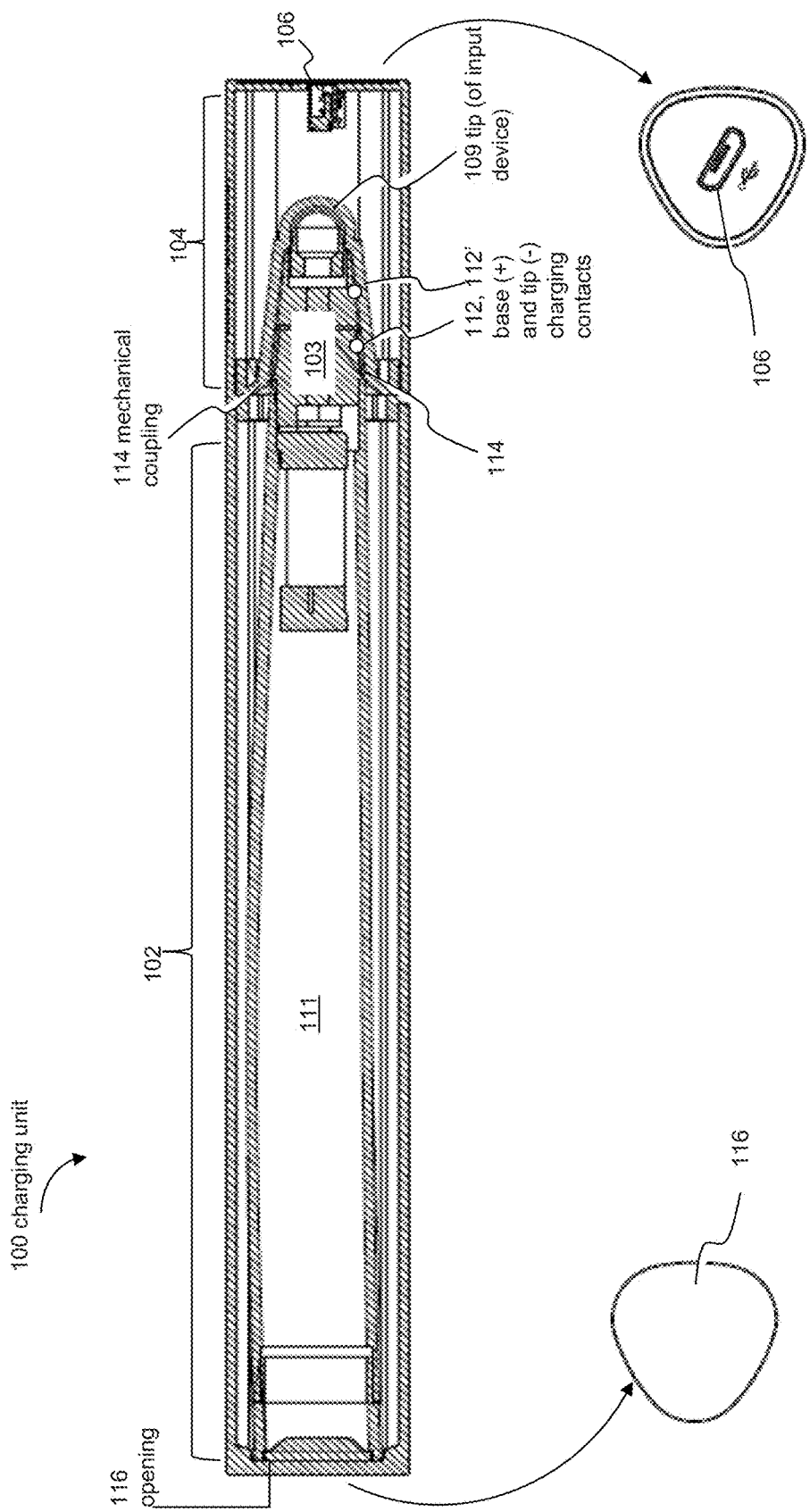
FIG. 1B provides end views and a cross-sectional side view of the charging unit illustrated in FIG. 1A.
Figure 1C:
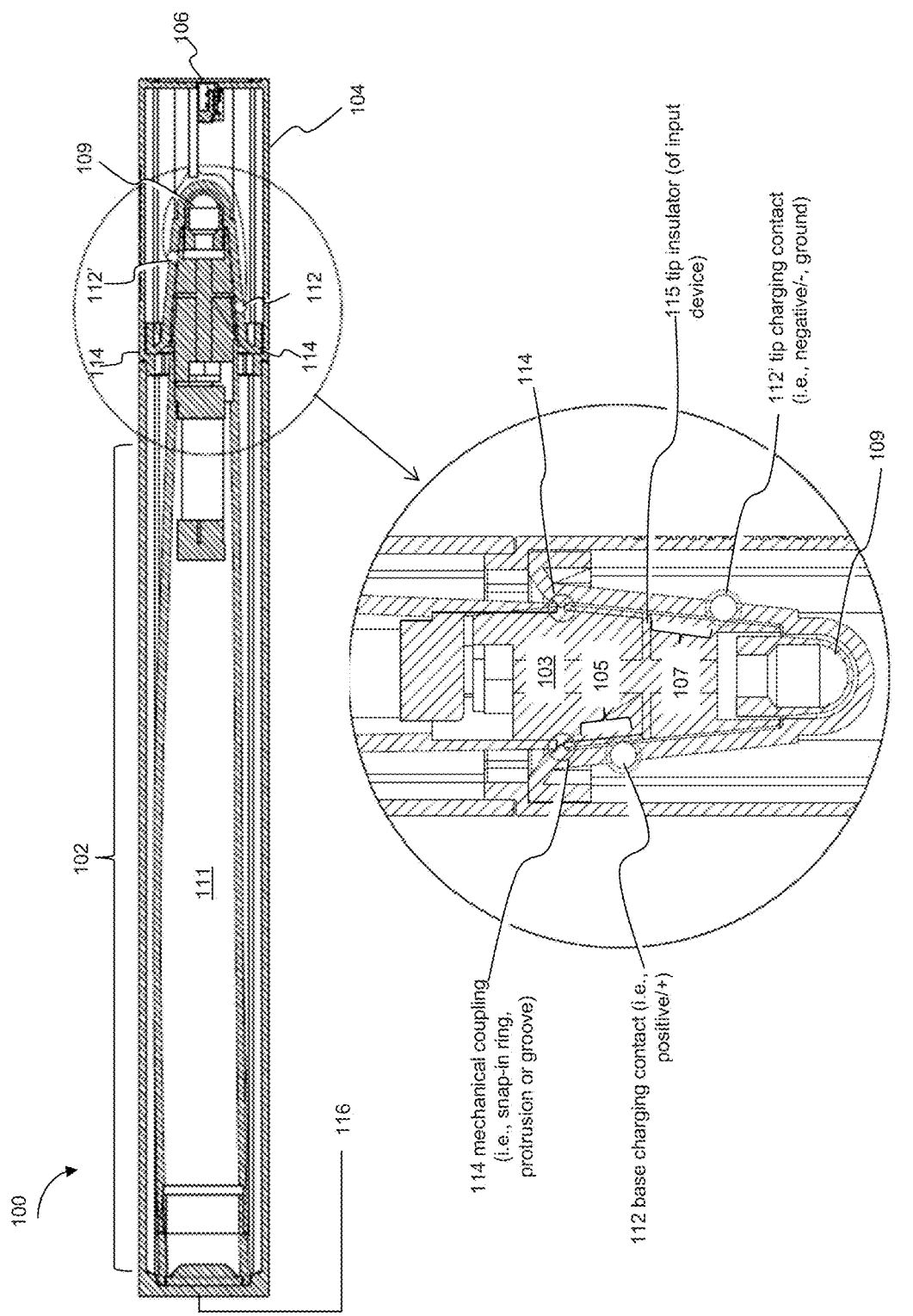
FIG. 1C provides a detailed cross-sectional view of the charging unit illustrated in FIGS. 1A and 1B.

An exemplary mobile conductive charging unit for charging an input device, such as a stylus, is described below with reference to FIGS. 1A-1C. FIGS. 1A-1C include various views of a conductive charging unit. In particular, FIG. 1A is a perspective view of a charging unit 100, FIG. 1B includes a cross-a sectional side view and end views of the charging unit 100, and FIG. 1C provides detailed cross-sectional views of the charging unit shown in FIGS. 1A and 1B.

FIG. 1A shows a conductive charging unit 100 comprising a sleeve portion 102 adapted to receive an input device 111. In the example of FIG. 1A, input device 111 is a stylus having a button 113. The charging unit 100 also includes a base portion 104 coupled to the sleeve portion 102. In an embodiment, the base portion 104 can be removably coupled to the sleeve portion 102. In embodiments, the base portion 104 is configured to accept electrical power from an external power source via an interface. As shown in the exemplary embodiments of FIGS. 1A and 1B, the interface is USB and base portion 104 includes a Micro USB receptacle so that the base portion 104 is connectable to an external power source (see, e.g., power sources 322 in FIG. 3) via a USB cable (see, e.g., power cable 218 in FIGS. 2A-2C and 3).

With continued reference to FIG. 1A, in embodiments, the base portion 104 can include an internal rechargeable power source 108 usable to charge the input device 111. According to an embodiment, the internal rechargeable power source 108 can be a rechargeable battery having an energy storage capacity and power capability sufficient to charge the input device 111.

As used herein, a "battery" can be any energy storage device capable of providing electrical power. As used herein, a "rechargeable battery" can be any rechargeable energy storage device capable of receiving a charge, storing energy (i.e., received electrical power), and providing power. For example, a rechargeable battery can accept a charge from another power source—including a rechargeable power source, store energy corresponding to the charge, and then provide power corresponding to the stored energy. Thus, the internal rechargeable power source 108 shown in FIG. 1A can be any rechargeable power source with a sufficiently large energy storage capacity and power output capability to charge the input device 111. In certain embodiments, the internal rechargeable power source 108 can be a rechargeable lithium-ion (Li-Ion), lithium-polymer (Li-poly), or nickel-metal hydride (NiMH) battery. It is to be understood that the internal rechargeable power source 108 can also be embodied as other energy cells or energy storage devices capable of accepting a charge from an external power source via port 106 and having sufficient energy storage capacity and power output capabilities to charge the input device 111. According to embodiments, the internal rechargeable power source 108 has a large enough energy storage capacity to charge an input device one or more times without having to be recharged itself from an external power source via the port 106.

FIG. 1B provides a cross-sectional side view and end views of the exemplary mobile charging unit 100 shown in FIG. 1A. As shown in FIG. 1B, the mobile charging unit 100 is adapted to receive an input device 111 via an opening 116 in the sleeve portion 102. The opening 116 is disposed at an end of the sleeve portion 102 distal from another end of the sleeve portion 102 that is coupled to the base portion 104. FIG. 1B also provides an end view of the end of the charging unit 100 having the opening 116 (i.e., the end of the sleeve portion 102 not coupled to the base portion 104), as well as an end view of the other end of the charging unit 100, which includes the port 106 (i.e., the end of the base portion 104 not coupled to the sleeve portion 102). The exemplary end views shown in FIG. 1B depict an opening 116 adapted to receive an input device 111 having a number of sides. In the non-limiting example of FIG. 1B, the opening 116 is substantially triangular, but it is to be understood that the sleeve portion 102 and base portion 104 may be adapted to accept input devices 111 having other shapes and dimensions, such as, for example, a stylus input device 111 having a body wherein one of the sides twists along the length of the stylus. Additionally, the input device 111 may have an optimal width and an optimal height to ergonomically enhance its use as a stylus.

If the input device 111 is a pressure sensitive stylus, a tip 109 of the input device 111 may be manufactured from a smooth and/or gentle material that is not harmful to a touch screen of a touch computing device. For example, the tip 109 may be manufactured from rubber, plastic, metal, and/or any other type of material. Additionally, included within the input device 111 may be a memory, a wireless transceiver, a processing unit, and/or other components (not shown). These components within a stylus input device 111 may be distributed evenly such that the weight distribution of the stylus is balanced. The mechanical coupling 114 is sufficiently robust to secure such a stylus within the charging unit 100 and to prevent movement of the stylus within the sleeve portion 102 and/or base portion 104 that may result in the application of harmful mechanical forces to components of the stylus, such as the tip 109. The tip 109 and other components of such a stylus can be protected from mechanical impulse forces while the stylus is housed within the charging unit 100. To this end, materials of the sleeve portion 102 and/or the base portion 104 may be selected to provide shock absorbency or vibration damping. In certain embodiments, an outer layer of the base portion 104 can comprise material having an American Society for Testing and Materials (ASTM) technical standard D2240 Durometer Type A scale value of about 60 (i.e., a Durometer value of about Shore A 60). One example of such a material is silicone rubber.

As shown in FIG. 1B, an end of the input device 111 (i.e., a stylus) inserted into the opening 116 has a nozzle housing 103 and a tip 109 at an end positioned within the base portion 104 of the charging unit 100. In embodiments, the nozzle housing 103 comprises a conductive surface. This conductive surface includes at least two charging zones (see zones 105 and 107 in FIG. 1C). The base portion 104 is adapted to receive the nozzle housing 103 and the tip 109 so that an electrical connection is made between the charging contacts 112, 112' of the base portion 104 and charging zones of the nozzle housing 103.

As shown in the non-limiting example of FIG. 1B, the nozzle housing 103 is a tapered portion of the stylus near the stylus tip 109. In instances where the input device 111 is a pressure sensitive stylus, the tip 109 can comprise a hollow rubber portion and be configured as a pressure sensitive tip coupled to pressure sensing components within the nozzle housing 103. These pressure sensing components are adapted to convey varying levels of mechanical pressure from the tip 109 to a pressure sensor within the stylus. The stylus body and the nozzle housing 103 may include electromechanical components and pressure sensors enabling the tip 109 to sense or detect many levels of pressure. Non-limiting examples of such components and sensors for a pressure sensitive stylus are described in commonly-assigned U.S. Pat. No. 9,207,821 issued on Dec. 8, 2015, and entitled "Pressure Sensor for Touch Input Devices," by Dowd et al., which is incorporated by reference herein in its entirety.

With continued reference to the example embodiment of FIG. 1B, the nozzle housing 103 includes a conductive surface that makes an electrical connection with charging contacts 112 and 112' in the base portion 104. This electrical connection can be used to transfer electrical power from the charging unit 100 to the input device 111. The base portion 104 includes a mechanical coupling 114 configured to secure the nozzle housing 103 within the base portion so that at least one charging zone of the nozzle housing 103 is electrically connected to the base charging contact 112. In the example embodiment of FIG. 1B, the base charging contact 112 is positioned adjacent to the mechanical coupling 114 between the mechanical coupling 114 and a tip charging contact 112'. In embodiments, one or both of the base and tip charging contacts 112 and 112' comprise a conductive metal or alloy, such as, but not limited to, brass. One or both of the base and tip charging contacts 112 and 112' can be spring-mounted leaf contacts configured to protrude into an interior surface of the base portion 104 facing conductive outer surfaces of the nozzle housing 103 so as to make physical contact with their respective charging zones on the nozzle housing 103. FIG. 1B also shows that the tip charging contact 112' is disposed between the base charging contact 112 and a cavity within the base portion 104 accommodating the tip 109. In the non-limiting embodiment shown in FIG. 1B, the base charging contact 112 is denoted with a positive sign (+) to indicate that it is electrically connected to a positive terminal of a power source and the tip charging contact 112' is denoted with a negative sign (−) to indicate that it is electrically connected to a negative terminal of the power source or a ground. In an alternative embodiment, the positions of the positive and negative charging contacts can be transposed. For example, the base charging contact 112 can be electrically connected to ground or a negative terminal of a power source and the tip charging contact 112' can be electrically connected to a positive terminal of the power source. In another embodiment, only the base charging contact 112 need be connected to a conductive portion of the nozzle housing 103 in order to charge the input device 111. According to this embodiment, the input device 111 within the charging unit 100 is not grounded via an electrical connection between the nozzle housing 103 and the tip charging contact 112', but is instead grounded via a conductive connection between another portion of the input device 111. For example, a conductive portion of the input device's 111 body and an adjacent ground contact within the sleeve portion 102 can be used in lieu of the ground connection via the tip charging contact 112'. In this example, if a stylus body (or a portion thereof) is made of a conductive alloy or metal such as aluminum, the stylus can be charged using the positive base charging contact 112 and the stylus can be grounded via a connection between its body and a ground connection in the sleeve portion 102 without requiring a ground connection between the nozzle housing 103 and the tip charging contact 112'. Additional details of the coupling and electrical connection between the base portion 104 and the nozzle housing 103 of the stylus are described below with reference to FIG. 1C.

FIG. 1C provides a detailed cross-sectional view of the base portion 104 and nozzle housing 103 shown in FIG. 1B. The base charging contact 112 and tip charging contact 112' are shown as rounded connectors akin to leaf spring connectors that connect to respective charging zones 105 and 107 of the nozzle housing 103. As seen in FIG. 1C, the nozzle housing 103 includes a tip insulator 115 disposed between charging zone 105 and charging zone 107. The tip insulator 115 electrically insulates charging zones 105 and 107 from each other. For simplicity, charging zone 107, which is disposed between the stylus tip 109 and a tip insulator 115 is referred to herein as the lower charging zone 107, and the charging zone 105 disposed between the tip insulator 115 and the body of the input device 111 is referred to herein as the upper charging zone. As shown in FIG. 1C, the mechanical coupling 114 can be embodied as a ring or protrusion within the base portion 104 configured to snap into a groove or indentation in the nozzle housing 103. Alternatively, the mechanical coupling may be a ring, tab, or protrusion extending from the base portion into a groove or indentation in the nozzle housing 103 in order to secure the nozzle housing 103 in place such that an electrical connection is made between charging zone 105 and base charging contact 112; and charging zone 107 and tip charging zone 112'. In the non-limiting example of FIG. 1C, the tip charging contact 112' adjacent to the stylus tip 109 has been electrically connected to ground or a negative terminal of a power source and is in physical contact with the lower charging zone 107, while the base charging contact 112 is electrically connected to a positive terminal of a power source and is in physical contact with the upper charging zone 105. As discussed above with regard to FIG. 1B, in an alternative embodiment, the polarity of the base and tip charging contacts 112 and 112' and their respective upper and lower charging zones 105 and 107 can be reversed. For example, the base charging contact 112, which is in physical contact with the upper charging zone 105, can be electrically connected to a negative terminal of a power source, and the tip charging contact 112', which is in physical contact with the lower charging zone 107, can be electrically connected to a positive terminal of the power source. The mechanical coupling 114 may be comprised of a substantially nonconductive material, such as plastic, so as to insulate the upper charging zone 105 from the body of the input device 111. This may be needed in order to electrically insulate charging zone 105 from the body of the input device 111 in cases where the body is made of a conductive alloy or metal. In an embodiment, a nonconductive insulator (see, e.g., upper insulating ring 317 in FIG. 3) is disposed between the upper charging zone 105 and the body of the input device 111 to electrically insulate the upper charging zone 105 from the stylus body and other stylus components. Non-limiting examples of arrangements and compositions of charging zones and insulators in a nozzle housing are described in commonly-assigned U.S. Pat. No. 9,367,149, issued Jun. 14, 2016, and entitled "Charging Mechanism Through a Conductive Stylus Nozzle," by Dowd et al., which is incorporated by reference herein in its entirety.

Figure 2A:
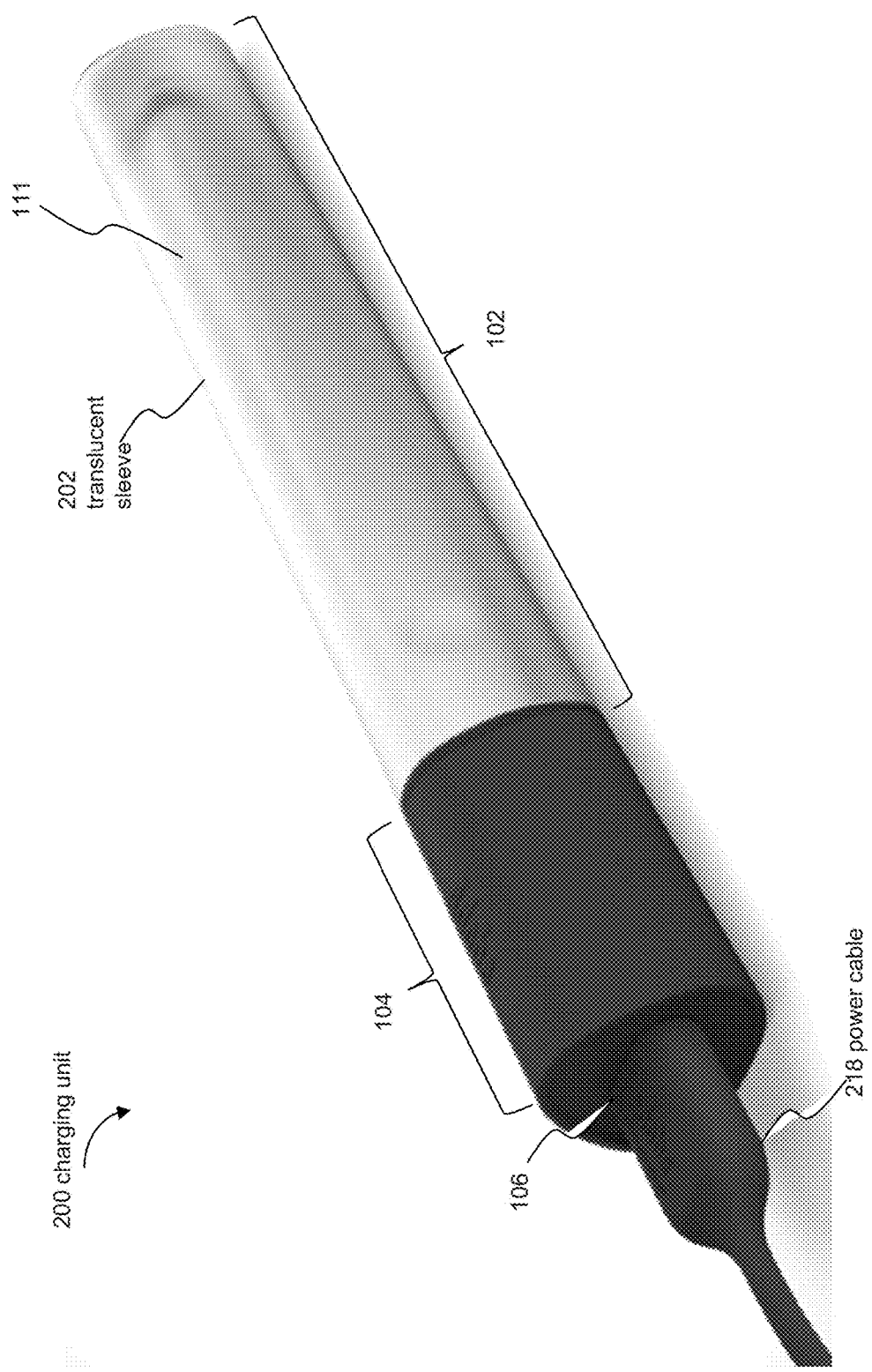
FIGS. 2A and 2B are perspective views of a charging unit for a stylus, in accordance with embodiments.
Figure 2B:
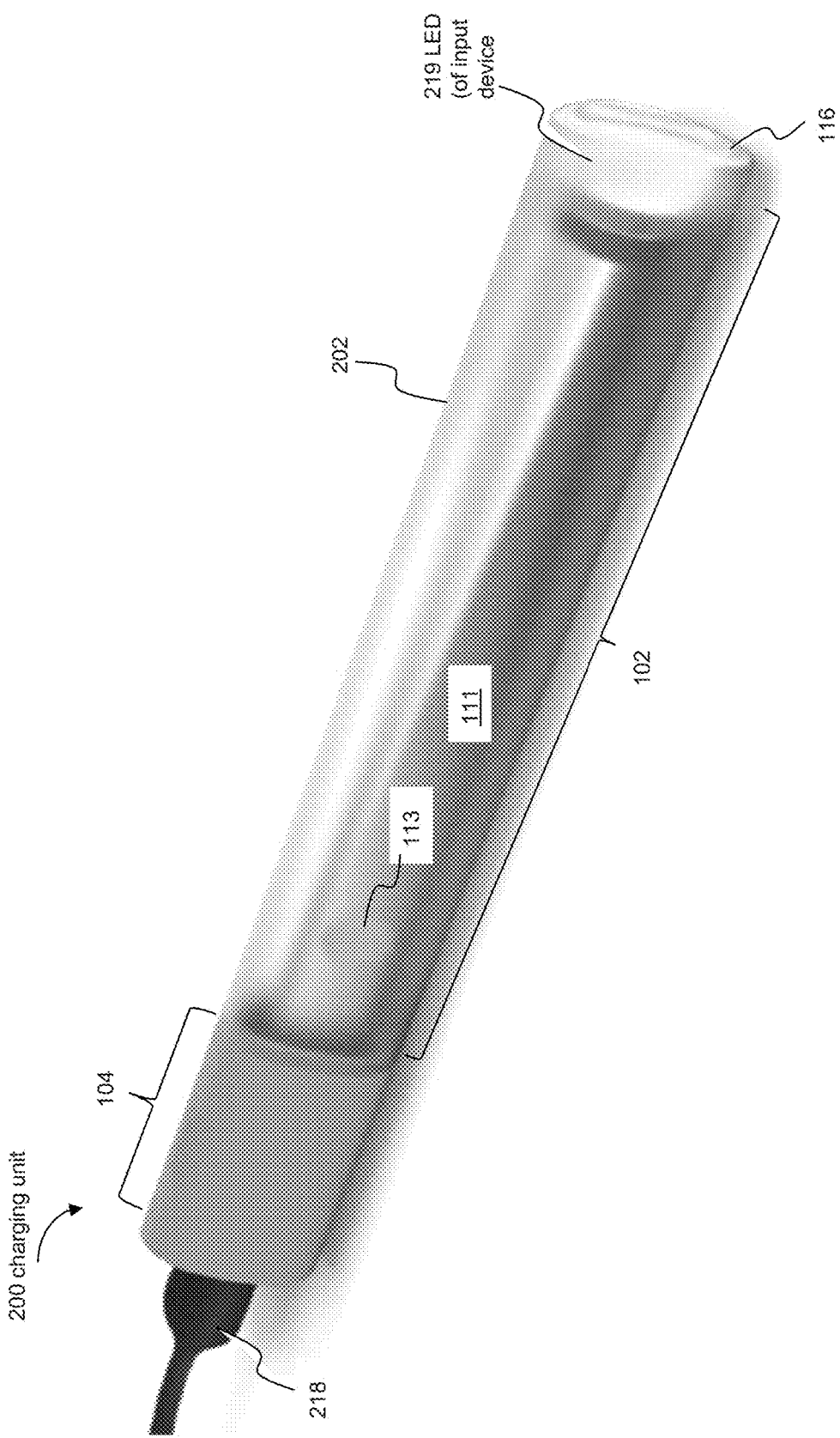
Figure 2C:
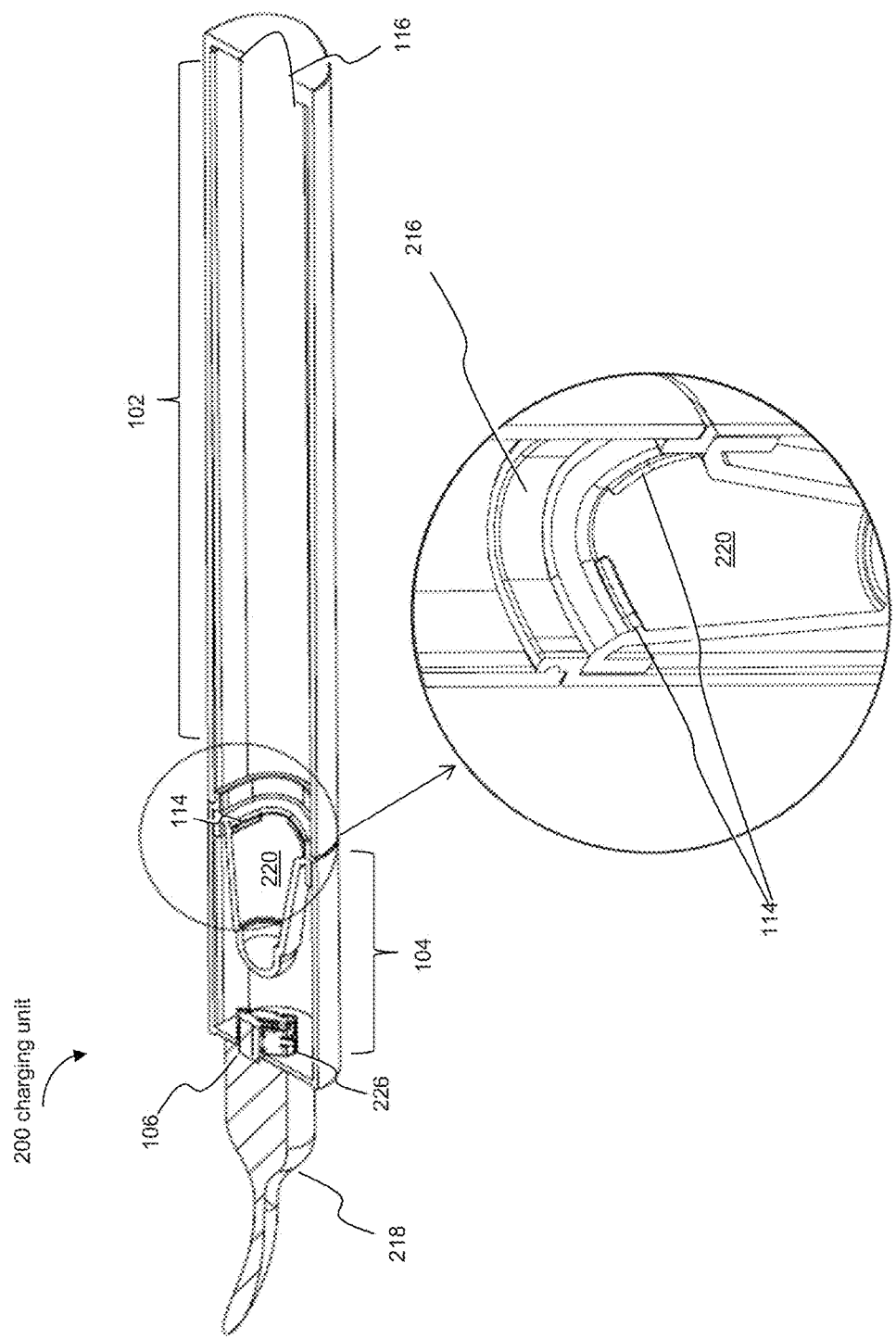
FIG. 2C provides a cross-sectional view of the charging unit illustrated in FIGS. 2A and 2B.

FIGS. 2A-2C provide views of an exemplary charging unit connectable to an external power source. In particular, FIGS. 2A and 2B provide perspective views of a charging unit 200 connected to an external power source (see, e.g., power sources 322 in FIG. 3) via a power cable 218. For illustrative purposes, the charging unit 200 shown in FIGS. 2A-2C is described with reference to elements of the exemplary conductive charging unit 100 implementation depicted in FIGS. 1A-1C. Other implementations of the charging unit 200, however, are possible.

FIG. 2A is a perspective view of the exterior of the charging unit 200 having the power cable 218 connected to the port 106. The power cable 218 shown in FIG. 2A is primarily used to receive electrical power (i.e., a charge) from an external power source at the port 106 of the charging unit 200. However, in embodiments, the power cable 218 can also be used to exchange data communications between certain external power sources 322 and the charging unit 200. For example, as discussed above with regard to FIGS. 1A and 1B, if the port 106 is a USB port and the interface used to receive power from an external power source is USB, then the power cable 218 is a USB cable that can be used to exchange data communications between the charging unit 200 and an external power source.

FIG. 2A also shows that the sleeve portion 102 of the charging unit 200 can be embodied as a translucent sleeve 202 so as to enable a user to readily determine that an input device 111 is currently in the charging unit 200.

FIG. 2B provides another perspective view of the charging unit 200 shown in FIG. 2A. As shown in FIG. 2B, the translucent sleeve 202 enables an LED 219 of the input device to remain visible while the stylus is within the charging unit 200. In the embodiment shown in FIG. 2B, the LED 219 can be seen through portions of the translucent sleeve 202 from multiple viewing angles while the input device 111 is within the charging unit 200. In alternative embodiments, the entire sleeve portion 102 or portions thereof can comprise transparent materials providing visibility to the LED 219 while the input device 111 is within the charging unit 200. For example, the sleeve portion 102 can include one or more transparent (or translucent) 'windows' disposed so that the LED 219 remains visible when the input device 111 is inserted into the charging unit 200. Additionally, the LED 219 is visible via the opening 116 in the sleeve portion 102.

In certain embodiments, the dimensions of the sleeve portion 102 and base portion 104 are such that the input device 111 can be fully inserted into the charging unit 200. According to these embodiments, the charging unit 200 can include a closure element, such as, but not limited to, a lid, cap, seal, door, or cover (not shown) configured to close the opening 116. In embodiments, closure element is an integrated part of the charging unit 200. For example, the opening 116 can be closed using a slide-able cap or hinged lid or door attached to the sleeve element 102. In alternative embodiments, the closure element is detachable from the charging unit 200. In cases where the opening 116 is closed after insertion of an input device 111 into the charging unit 200, the closure element can comprise transparent or translucent materials so that the LED 219 remains visible.

In embodiments where the power cable 218 carries data communications (i.e., via a USB interface), the LED 219 can indicate a communication status for any data communications between the charging unit 300 and/or an input device 111 inserted within it to an external power source with data communication capabilities (see, e.g., external power sources 322B-D in FIG. 3).

FIG. 2C provides cross-sectional views of the charging unit 200 shown in FIGS. 2A and 2B.

As shown in FIG. 2C, the base portion 104 includes a cavity 220 facing an opening 116 in the sleeve portion 102 where the sleeve portion 102 is coupled to the base portion 104. In alternative embodiments, the charging unit 200 can comprise a single housing with the opening 116 at one end adapted to receive an input device 111 to be charged and a cavity 220 at another end adapted to receive an end of the input device 111 having charging zones. That is, the sleeve and base portions 102 and 104 need not be two portions coupled together and an alternative embodiment of the charger can be embodied as a single-piece housing including the opening 116, the cavity 220, the port 106 and other features described herein with reference to the exemplary charging units described herein. In cases where the input device 111 is a stylus, such a single housing, like the exemplary sleeve portion 102, will be an elongate housing configured to accept the body, nozzle housing 103, and tip 109 of the stylus. Regardless of whether a single housing or sleeve and base portions 102 and 104 are used, the cavity 220 is distal from the opening 116. The cavity 220 is shaped and adapted to receive an end of the input device 111 including the conductive nozzle housing 103 and the tip 109. FIG. 2C shows that the cavity 220 includes the mechanical coupling mechanism 114 configured to secure the end of the input device 111. In FIG. 2C, the mechanical coupling is depicted as grooves encircling at least part of the cavity 220. In this embodiment, a protruding ring or tab on the input device near where the nozzle housing 103 meets the body of a stylus input device 111 is shaped such that it can snap into the grooved portion of the mechanical coupling 114. The mechanical coupling 114 can also comprise one or more indentations in the cavity 220 configured to accept a mechanical connection (i.e., a snap-in connection) from tabs or protrusions on an exterior surface of the input device 111, such as the nozzle housing 103. In alternative embodiments, the mechanical coupling 114 can comprise a tab, ring, or other protrusion on an interior surface of the sleeve portion 102 or the cavity 220 so that the protrusion can snap into a groove or indentation on an external surface of the input device 111 such that the nozzle housing 103 will be secured within the cavity 220. The mechanical coupling 114 can comprise nonconductive semi rigid materials such as plastics. The protrusions of mechanical coupling 114 or the input device 111 can also incorporate spring mounted elements configured to secure the nozzle housing 103 in the cavity 220 so that the tip 109 is protected and the charging contacts 112 and 112' are in physical contact with their respective charging zones on the conductive surface of the nozzle housing 103.

With continued reference to FIG. 2C, the charging unit 200 includes circuitry 226. Among other functionality, the circuitry 226 is configured to transfer electrical power received at the port 106 via the power cable 218 to the internal rechargeable power source 108 described above with reference to FIG. 1A or to the charging contacts 112 and 112'. Depending on the interface used to receive power at the port 106 and the characteristics of the internal rechargeable power source 108, the circuitry 226 may convert the received power (i.e., alter its voltage) before it is transferred to the internal rechargeable power source 108. Similarly, the circuitry 226 may be configured to convert power received at the port 106 based on properties of a rechargeable battery used by an input device 111 to be charged via an electrical connection to the base and tip charging contacts 112 and 112'.

In accordance with embodiments, the circuitry 226 includes a computer readable storage medium with executable instructions or logic for indicating a status via the LED 219 of a stylus. The circuitry 226 can comprise a printed circuit board (PCB) having one or more ICs or ASICs with logic encoded on them. The logic is executable by a processor, such as a microprocessor chip included in the circuitry 226 as part of the PCB. When executed, the logic determines a status, such as a docking status, a charging status, a battery status, a pairing status, and a communication status, and indicates the determined status via the LED 219.

In one embodiment, the LED 219 may change color while the input device 111 is connecting or docking with the charging unit 300, similar to an indication that a stylus input device 111 can convey with the LED 219 when it is pairing with a touch computing device. For example, the LED 219 may turn a solid blue and/or another color when it has established an electrical connection with the charging contacts 112 and 112'. Unlike a pairing operation between a stylus input device 111 and a touch computing device, which is typically performed wirelessly and/or through touch inputs, docking with the charging unit 200 requires an electrical connection between, such as the connection between the base and tip charging contacts 112 and 112' and respective charging zones of the input device 111. In order to distinguish between docking with the charging unit 300 and pairing with a touch computing device, pairing may be indicated by pulsating the LED 219 in blue and/or another color while the input device 111 and the touch computing device are performing the pairing operation. Once the input device 111 has successfully docked with the charging unit 200, the LED 219 may turn off to indicate that the electrical connection has been established.

In embodiments, the LED 219 can be used to indicate a charging or battery status. Examples of how the LED 219 can be used to convey a charging and/or battery status are discussed below with reference to FIGS. 3 and 4.

FIG. 3 illustrates components of an exemplary charging unit 300. FIG. 3 is described with continued reference to the embodiments illustrated in FIGS. 1A-1C and 2A-2C. However, FIG. 3 is not limited to those embodiments. In particular, FIG. 3 provides an exploded view of the internal and external components of the charging unit 300. These components include a base housing 324 of the base portion 104. In order to protect a nozzle housing 103 inserted into the cavity 220 within the base portion 104, the base housing 324 can comprise shock absorbing and/or vibration damping materials. In certain embodiments, the base housing 324 comprises materials having an American Society for Testing and Materials (ASTM) technical standard D2240 Durometer Type A scale value of about 60 (i.e., a Durometer value of about Shore A 60). One example of such a material is silicone rubber. In other embodiments, the base housing comprises a lightweight, durable, and substantially nonconductive material such as an acrylonitrile butadiene styrene (ABS) plastic.

The base housing 324 is adapted to encase the circuitry 226, its attached port 106, leads 321 and 321' from the circuitry to the charging contacts 112 and 112' and a component including the cavity 220. The base housing is also configured to be coupled to an end of the sleeve portion 102 distal from the opening 116 within the sleeve portion 102 such the cavity 220 is facing the opening 116. As shown, lead 321 can comprise a wire or other electricity transmission means connecting a positive terminal of a power supply to the base charging contact 112 and lead 321' can be embodied as another wire or means to electrically connect a negative terminal of a power supply (or ground) to the tip charging contact 112'. FIG. 3 also shows that the end of the input device 111 to be inserted into the cavity 220 for charging includes the tip 109 at its extremity. Adjacent to the tip is the lower charging zone 107 which is separated from the upper charging zone 105 by a tip insulator 115 embodied as a substantially nonconductive ring (i.e., a tip insulating ring or a lower insulating ring). Disposed between the upper charging zone 105 and the body of the input device 111 is an upper insulating ring 317. The upper insulating ring 317 can insulate the conductive upper charging zone 105 from the body of the input device 111 in cases where the body is made of a conductive alloy or metal, such as aluminum. In this way, the upper insulating ring 317 disposed between the upper charging zone 105 and the body of the input device 111 electrically insulates the upper charging zone 105 from the stylus body and other stylus components, such as the button 113.

Exemplary Connections to External Power Sources

As shown in FIG. 3, the charging unit 300 is connectable to a variety of external power sources 322 via a power cable 218 and an interface. For example, if the interface is USB, as shown in FIG. 1B, the port 106 can be a Micro-B USB port and the circuitry 226 has instructions encoded into it for performing data communications pursuant to USB communications protocols. In embodiments, the base portion 104 is configured to accept electrical power from an external power source via an interface. As shown in the exemplary embodiments of FIGS. 1A and 1B, the interface is USB and the port 106 is a Micro-B USB receptacle. According to these embodiments, the base portion 104 is connectable to an external power source (see, e.g., external power sources 322 in FIG. 3) via a USB cable.

With reference to FIG. 3, when an external power source 322 provides power via a USB interface, the power cable 218 is a USB cable. In one embodiment, the port 106 is a Micro-B USB receptacle adapted to accept a Micro-B USB plug on one end of the power cable 218. In this example, the other end of the power cable 218 is a USB connector capable of connecting to a USB port in one or more of the external power sources 322B-D. For example, the power cable 218 can have a male Micro-B USB plug or connector on an end to be connected to the port 106 and a male USB 2.0 or 3.0 Standard-A type plug on the other end for connection to a female USB Type A receptacle of a PC power source 322B or a laptop power source 322C. Alternatively, the power cable 218 can have a micro USB plug on one end and a USB Type B plug on the other end for connecting to a USB Type B receptacle of an external power source, such as the laptop power source 322C. Such a Micro USB-to-USB power cable 218 can also be used to connect port 106 to a USB port of an alternating current (AC) to direct current (DC) adapter (not shown) plugged into AC outlet power source 322A. According to this embodiment, the power cable 218 is a USB cable transmitting DC current to the port 106 from the AC/DC adapter. As would be understood by those skilled in the relevant art(s), such an AC/DC adapter can include a transformer to convert AC current received via the AC outlet power source 322A, which may be, for example, a 120 volt outlet, to a DC current with voltage and amperage compatible with the USB interface and the Micro USB port 106 (i.e., 4.55-5.25 volts and 500 milliamps-5 amps).

Alternatively, the end of the power cable 218 to be connected to an external power source, such as the mobile device power source 322D, can be a Mini or Micro USB plug, such as, but not limited to, a Mini-A, Mini-B, Micro-A, or Micro-B plug. It is to be understood that various configurations of the power cable 218 can be used with embodiments of the charging units disclosed herein such that the charging units can connect to a variety of stationary and mobile external power sources, including mobile device power sources 322D such as smartphones, mobile gaming devices, and mobile touch computing devices having Mini or Micro USB receptacles.

It is to be understood that alternative interfaces besides USB can be used to receive power via the port 106. For example, the interface can be a simple direct current (DC) port configured to accept DC current of a sufficient voltage to charge the input device 111 and/or the internal rechargeable power source 108 in the base portion 104. In one example, an alternating current (AC) to DC adaptor may be plugged into an AC outlet power source 322A. According to this embodiment, the power cable 218 carries DC current to the port 106 from an AC/DC adapter or converter (not shown). As would be understood by those skilled in the relevant art(s), such AC/DC adapters can include a transformer to convert AC current received via the AC outlet power source 322A, which may output AC current in the 110-220 volt range, for example, to a DC current with a lower voltage that is compatible with port 106 and usable to charge the input device 111.

As shown in FIG. 3, an external power source 322 can supply electrical power to the base portion 104 of charging unit 300 via power cable 218. In the examples shown in FIG. 3, the external power source 322 can be one of a variety of computing device power sources 322B-D, such as, but not limited to, a desktop computer power source 322B, a mobile computing device power source 322C, or a smartphone power source 322D. Non-limiting examples of mobile computing device power sources 322C include laptop computers and tablet computers. It is to be understood that in addition to the exemplary external power sources 322A-D shown in FIG. 3, in embodiments of the charging unit 300 using a USB port as the port 106, powered USB ports not associated with a particular computing device can also be used as an external power source 322. For example, a powered USB port included or built into a display console, an airport charging station/kiosk, hotel room, conference room, airplane, car, and their like can be connected to the port 106 using an appropriate USB power cable 218 and used as an external power source. Using computing device power sources 322B-D as external power sources 322 as shown in FIG. 3 enables the charging unit 300 to recharge the input device 111 and/or its internal rechargeable power source 108 when an AC outlet power source 322A or an AC adapter is unavailable.

An AC power adapter plugged into an AC outlet power source 322A can also form part of an external power source 322, as can any other device capable of transmitting electrical current via power cable 218 to port 106 using an interface compatible with the base portion 104.

Exemplary Determination and Indication of a Charging Status

According to embodiments, the circuitry 226 comprises a computer-readable medium having instructions or logic stored or encoded thereon, that when executed by a processor, causes the processor to indicate a charging status via the LED 219. In embodiments, the status can be one or more of a charging status and a battery status. The logic can determine a charging status of a rechargeable battery of an input device 111 inserted into the charging unit 300. The logic can also determine a charging status of a rechargeable battery used as the internal rechargeable power source 108 of the charging unit 300. An exemplary charging status can be one or more of charging the input device 111 from the internal rechargeable power source 108 of the charging unit 300, charging the input device 111 from an external power source 322, charging the internal rechargeable power source 108 from an external power source 322, and not charging. The logic can comprise instructions to cycle the LED 219 on and off so as to iteratively blink the LED 219 when the status is charging the input device 111 from an external power source 322; alternate between partially and fully illuminating the LED 219 so as to pulsate the LED 219 when the status is charging the input device 111 from the internal rechargeable power source 108; and turn off the LED 219 when the status is not charging.

Exemplary Determination and Indication of a Battery Status

In an embodiment, when executed, the logic stored on a computer readable medium on the circuitry 226 can determine a battery's status based on level of charge or a state of charge (SOC) of the battery, wherein the SOC is measured as a percentage of available power as compared to the battery's maximum energy storage capacity. In cases where multi-cell batteries are used, the SOC of a battery can be determined based on an aggregate SOC of cells of the battery. The SOC of a battery can include a measurement of the current ability of the battery to supply (send) energy and to consume (receive) energy. In certain exemplary embodiments, the SOC may be a percentage that runs from 0% to 100%, where 100% means that no more energy can be stored in the battery (i.e., the battery is fully charged and cannot accept a charge). In certain embodiments, the logic may calculate the SOC from open circuit and/or closed circuit voltage levels. However, as would be understood by those skilled in the relevant art(s), a battery status in the form of an SOC of the battery may be calculated in any number of ways. The logic can determine a battery status for a rechargeable battery used as the internal rechargeable power source 108 for the charging unit 300 as well as a status for a rechargeable battery of an input device 111 inserted into the charging unit 300. Additionally, a battery status can be determined based on an expected remaining useful life, measured as an estimated duration the battery can supply a useful level of power. In the case of the input device's 111 rechargeable battery, this may be expressed as an amount of time (i.e., in hours and/or minutes) the battery can provide sufficient power to operate the input device 111. For example, the LED 219 can indicate that the battery of the input device 111 is substantially depleted in response to determining, by the logic, that the battery will be unable to power the input device 111 more than 15 minutes into the future. In the case of a rechargeable battery used as the internal rechargeable power source 108 of the charging unit 200, the LED 219 can convey that the battery is substantially depleted or nearing depletion if the logic determines that the battery lacks sufficient power to recharge the input device 111. According to embodiments, a battery status can be one or more of fully charged and substantially depleted. In embodiments, the logic may determine that a battery is substantially depleted (i.e., nearly empty) when its SOC is below a certain threshold, such as 10%. According to embodiments, the logic may determine that a battery having an SOC above a certain threshold, such as 97%, is substantially charged (i.e., fully charged). It is to be understood that the SOC and useful life thresholds provided above are merely exemplary and that these thresholds can be tunable parameters changeable by a user of the charging unit 200 and/or a user of the input device 111.

According to embodiments, the circuitry 226 can include instructions for cycling the LED 219 on and off a predetermined number of iterations to blink the LED 219 when a battery status is substantially depleted and instructions for illuminating the LED 219 at a maximum brightness when a battery status is fully charged. In embodiments, the number of iterations for blinking the LED 219 as well as the rapidity of the blinking and pulsating described above are user-tunable parameters.

Figure 4:
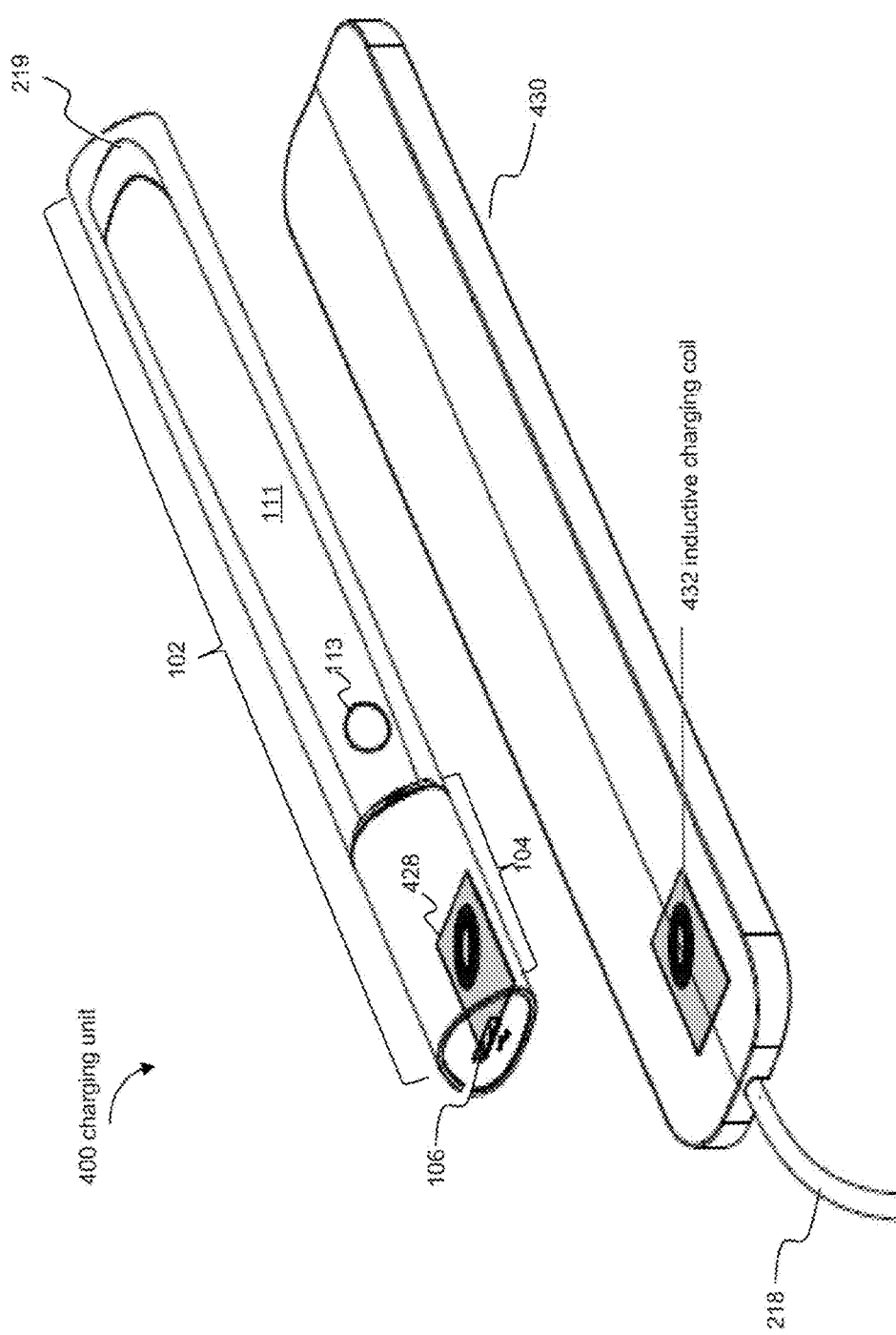
FIG. 4 is a perspective view of an inductive charging unit, according to certain embodiments.

Although not shown in FIG. 3, embodiments can employ multiple LEDs having different colors or other communications means, such as sounds or vibrations emitted from one of the charging unit 300 or the input device 111 to indicate the exemplary charging and battery status information discussed above with reference to FIG. 2C. For example, a white LED can be fully illuminated to indicate a battery status of fully charged, a pulsating red LED can indicate a charging status of currently charging the input device 111 (either from an external power source 322 or the internal rechargeable power source 108), and a pulsating green LED can indicate a status of charging the internal rechargeable power source 108 from an external power source 322. Additionally, a battery or charging status can be communicated using a wireless transceiver of the input device 111 (not shown). For example, an input device 111 embodied as a multifunction stylus may include a wireless transceiver, such as a Bluetooth® transceiver, a wireless network transceiver, and/or some other wireless transceiver for such communications, Exemplary Inductive Charging Unit FIG. 4 provides a perspective view of an exemplary inductive charging unit. FIG. 4 is described with continued reference to the embodiments illustrated in FIGS. 1A-1C, 2A-2C, and 3. However, FIG. 4 is not limited to those embodiments. As shown in FIG. 4, an inductive charging unit 400 has an induction coil 428 in its base portion 104. The induction coil 428 is configured to inductively couple to an inductive charging coil 432 of an external, inductive power source 430. The inductive power source 430 can be embodied as an inductive charging mat capable of generating an electromagnetic field and coupling with the induction coil 428 of the inductive charging unit 400. As shown, the inductive power source 430 (i.e., an inductive charging base station) can in turn be connected to an external power source 322 via the power cable 218. The induction coil 428 is capable of receiving energy wirelessly from the inductive charging coil 432 in the form of electromagnetic waves of an electromagnetic field. The inductive charging coil 432 creates an alternating electromagnetic field from within the inductive power source 430 (i.e., the charging base station), and the induction coil 428 in the inductive charging unit 400 takes power from the electromagnetic field and converts it back into electrical current to charge the internal rechargeable power source 108 of the charging unit 400 and/or a rechargeable battery of the input device 111. The induction coil 428 and inductive charging coil 432 in proximity to each other combine to form an electrical transformer. The induction coil 428, together with circuitry, such as circuitry 226 shown in FIGS. 2C and 3, converts the received energy to electrical current. The inductive charging unit 400 then transfers this current to an internal rechargeable power source 108 configured to receive the electrical current, store energy corresponding to the received current, and charge the input device 111. As depicted in FIG. 4, the charging unit 400, and not the input device 111, includes the induction coil 428. As such, the inductive coupling occurs between the charging unit 400 and the inductive power source 430, and not between the inductive power source 430 and the input device 111. This allows for conductive charging of the input device 111 as described above with reference to FIGS. 1A-1C, 2A-C and 3. The power source for this conductive charging is an internal battery or energy storage device (see, e.g., internal rechargeable power source 108 in FIG. 1A) of the charging unit 400. In this way, the input device 111 can benefit from wireless, near-field inductive charging (albeit indirectly) without having to accommodate the induction coil 428 in its body or nozzle housing 103, which would add weight and size to the input device 111. This solution also avoids potential issues related to heat generation within the input device 111 that could be a byproduct of inductive coupling and charging with an induction coil 428 disposed inside the input device 111.

As further shown in FIG. 4, the charging unit 400 includes the port 106 for receiving power from an external power source 322. As such, an embodiment of the charging unit 400 can function as a dual mode charging unit. For example, the charging unit 400 can inductively charge its internal battery when it is in proximity to a compatible inductive power source 430, thereby functioning as an inductive charging unit. In addition, when unable to inductively couple to an inductive power source 430, the charging unit 400 can connect to an external power source 322 directly via the port 106, thereby functioning as a conductive charging unit.

In the context of the exemplary inductive charging unit 400, the LED 219 of the input device 111 can be used to indicate an additional charging status. For example, by using circuitry similar to circuitry 226, the circuitry having logic encoded thereon, that when executed by a processor, causes the processor to indicate a status via the LED 219. In embodiments, the status can be one or more of charging the input device 111, charging the internal rechargeable power source 108 of the inductive charging unit 400, inductive coupling to the inductive power source 430 (i.e., the induction coil 428 is inductively coupled to the inductive charging coil 432), and not charging. In certain non-limiting embodiments, the logic comprises instructions to solidly illuminate the LED 219 when the status is charging the input device 111; pulsate the LED 219 when the status is charging the internal rechargeable power source 108 of the inductive charging unit 400; turn off the LED 219 when the charging status is not charging; and pulsate or blink the LED 219 a predetermined number of times when the status is inductive coupling to the inductive power source 430.

Exemplary Protective Sleeve

Figure 5:
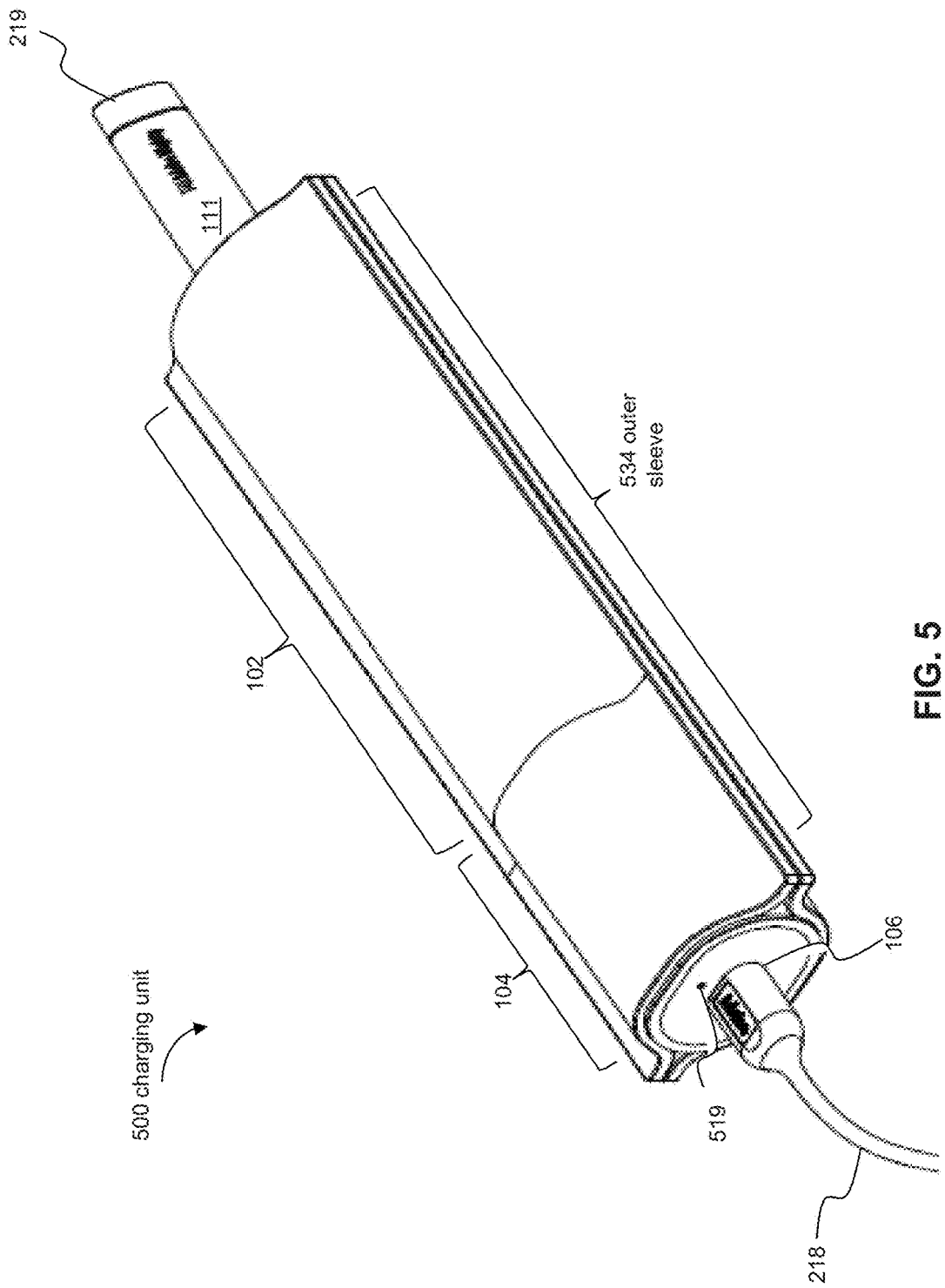
FIG. 5 provides a perspective view of a charging unit with a protective sleeve for a stylus, in accordance with embodiments.

FIG. 5 provides a perspective external view of a charging unit with a protective sleeve for a stylus. For illustrative purposes, the charging unit 500 shown in FIG. 5 is described with reference to elements of the exemplary implementations of the charging units 100, 200, 300, and 400 depicted in FIGS. 1A-1C, 2A-2C, 3, and 4. Other implementations of the charging unit 500, however, are possible.

As shown in FIG. 5, the charging unit 500 can include an outer sleeve 534 covering both the sleeve and base portions 102 and 104. The outer sleeve 534 can comprise protective, shock absorbing, and/or vibration damping materials configured to protect components of an input device 111 inserted into the charging unit 500. For example, shock absorbing material included in the outer sleeve 534 can be configured to compress or deform in response to a mechanical force applied to the exterior of the charging unit 500. In embodiments, the outer sleeve 534 can comprise cushioning materials, such as, but not limited to, fabric (i.e., felt), silicone rubber, and polychloroprene (i.e., neoprene). The cushioning materials may in turn be covered by a layer of flexible material, such as, for example, leather. One or more layers of the outer sleeve 534 are arranged configured to protect components of a stylus within the charging unit 500 from mechanical forces applied to the charging unit 500. For example, the charging unit 500 can be configured to absorb external mechanical and/or acceleration forces applied to it when it (and the input device 111 within it) is dropped, flexed, and/or twisted.

FIG. 5 also shows that the charging unit 500 can include its own LED 519. The LED 519 can be used to indicate a status in a similar manner as discussed above with regard to the use of the LED 219 of the input device 111. For example, the LED 519 of the base portion 104 can be controlled by circuitry 226 having logic stored thereon, that when executed by a processor, causes the processor to indicate a status via the LED 519, wherein the status is one or more of charging the input device 111, charging the internal rechargeable power source 108 of the charging unit 500 (i.e., using power received at the port 106 from an external power source 322 connected via the power cable 218, and not charging. In certain embodiments, the logic comprises instructions to illuminate the LED 519 when the status is charging the input device 111; pulsate the LED 519 when the status is charging the internal rechargeable power source 108 of the charging unit 500; and turn off the LED 519 when the status is not charging. In another embodiment, the inductive charging unit 400 described above with reference to FIG. 4 can also include an LED in its base portion 104. In this example, such an LED of the inductive charging unit 400 can be used to convey induction-related status instead of or in addition to using the LED 219 of the input device 111.

Exemplary Charging System

The exemplary input devices, charging units, interface, and power sources described herein can comprise components of a system for charging an input device. With reference to the embodiments shown in FIGS. 1A-1C and 3, an exemplary charging system can comprise one or more external power sources 322 adapted to transmit electrical power via an interface, such as, but not limited to USB. The system can also comprise a charging unit, such as charging unit 300. The charging unit can comprise a housing adapted to receive the input device 111 via an opening 116 in the housing. The housing can consist of a single piece or can alternatively comprise sleeve and base portions 102 and 104 that are coupled together. The charging unit of the system includes a mechanical coupling 114 or other suitable coupling mechanism adapted to secure a received input device 111 within the housing and at least one charging contact 112 adapted to transfer electrical current via an electrical connection to a conductive surface of an input device 111 received via the opening 116 and secured within the housing by the coupling mechanism. The charging unit can further comprise a port 106 or other suitable receptacle capable of receiving the electrical power from the external power source 322 via the interface.

According to an exemplary system, the charging unit is configured to detect coupling of an input device 111 received via the opening 116. This detection can be accomplished through a mechanical or electrical sensor within the housing. The detection can also be accomplished in the system by determining that an electrical connection has been made between, e.g., a charging contact 112 or 112' and a conductive region of the input device 111. The charging unit of the system is also configured to receive electrical power from the external power source 322 via the interface charge the received input device 111 by transferring the electrical power (i.e., power) received via the interface to a rechargeable battery of the input device 111. This energy transfer can be achieved via an electrical connection between the base and tip charging contacts 112 and 112' and respective charging zones of a conductive surface of the input device 111, such as the nozzle housing 103.

In an embodiment, the charging system of also includes an internal rechargeable power source 108 within the housing of the charging unit. The internal rechargeable power source 108 can be embodied as an internal battery in the housing having sufficient energy storage capacity to recharge a rechargeable battery of the input device 111 one or more times without requiring receipt of electrical power from an external power source 322. In an embodiment of the charging system, at least a portion of the housing of the charging unit is adapted to provide mechanical force protection for a received input device. For example, one or more outer layers of the housing can comprise cushioning or shock absorbing materials such as, but not limited to, a fabric (i.e., felt) or an elastomer (i.e., synthetic rubber, natural rubber, neoprene, silicone rubber).

Exemplary Charging Method

Figure 6:
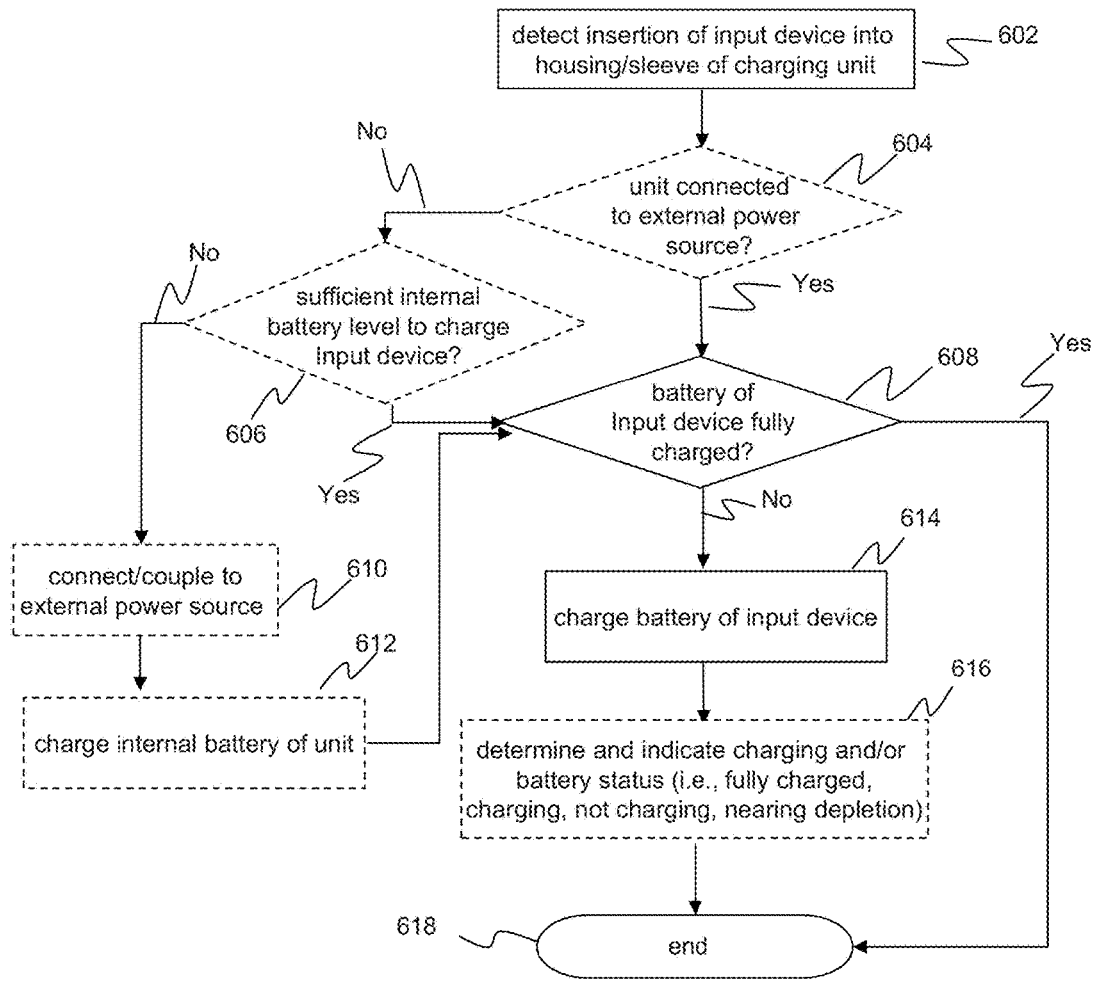
FIG. 6 is a flowchart illustrating an exemplary method for charging an input device.

FIG. 6 is a flowchart that provides one example of the operation of the charging units and systems described herein. It is understood that the flowchart of FIG. 6 provides merely an example of the many different types of functional arrangements that may be employed to implement the charging operations of the mobile charging units and charging system as described herein. As an alternative, the flowchart of FIG. 6 may be viewed as depicting an example of steps of a method implemented by the charging units, logic, instructions, and system described herein according to one or more embodiments. For illustrative purposes, the method 600 is described with reference to the charging apparatus/device and system implementations depicted in FIGS. 1A and 3-5. Other implementations, however, are possible. The steps of the charging method 600 do not necessarily have to occur in the order shown in FIG. 6 and described below. According to embodiments, some of the steps shown in FIG. 6 are optional. Optional steps are indicated in the flowchart by dashed lines (see, e.g., steps 604, 606, 610, 612, and 616).

Beginning with step 602, a charging unit such as the conductive charging units 100 and 300 shown in FIGS. 1A and 3, or the inductive charging unit 400 shown in FIG. 4, receives an input device 111 from a user. In an embodiment, this step can comprise detecting insertion of an input device 111 into a housing of a charging unit having an internal rechargeable power source, such as an internal battery, and an interface capable of receiving electrical power from an external power source such as the external power sources 322 shown in FIG. 3. After detecting insertion of the input device 111 into the charging unit, control is optionally passed to step 604 to determine if the charging unit is connected to an external power source. If step 604 is not applicable or skipped, control is passed to step 608.

In optional step 604, a determination is made as to whether the charging unit is currently receiving electrical power from, or is connected to/coupled with an external power source. As the charging unit used to carry out method 600 is designed to be used in mobile environments, step 604 can be omitted in cases where the charging unit has an internal rechargeable power source (i.e., an internal battery in the example of FIG. 6) sufficiently charged to charge the input device 111 and/or the method 600 is being carried out in an environment lacking any external power sources. In one embodiment where step 604 is executed, the charging unit is a conductive charging unit connectable to an external power source 322 via a power cable 218 using a port 106 and an interface. In another embodiment where optional step 604 applies, the charging unit is an inductive charging unit 400 that can inductively couple with an inductive power source 430. If it is determined that that electrical power energy is not being received from an external power source 322 and that the charging unit is not connected to an external power source 322, control is passed to step 606. Otherwise, if it is determined in step 604 that the charging unit is either receiving electrical power from an external power source 322 or that the charging unit is currently connected to an external power source 322, control is passed to step 608.

In optional step 606, a determination is made as to whether an internal rechargeable power source, such as an internal battery, of the charging unit has a sufficient level of energy to charge the input device 111 received in step 602. As with step 604, step 606 is optional in cases where the charging unit's internal rechargeable power source (i.e., the charging unit's internal battery) has a sufficient charge to charge the input device 111 and/or the method 600 is being carried out in an environment lacking any external power sources, such as when the charging method is being conducted while a user of the input device 111 is in flight or otherwise unable to connect the charging unit to an external power source. In an embodiment, step 606 comprises calculating a state of charge (SOC) for the charging unit's internal battery in addition to calculating an SOC for the rechargeable battery of the input device 111. The SOC of each battery can be calculated based on a percentage of available power as compared to the respective, total energy storage capacity of each battery. According to this embodiment, the determination in step 610 is based at least in part on the calculated SOC values for the unit's internal battery and the rechargeable battery of the input device 111. If it is determined that the internal rechargeable power source has sufficient power available to charge the input device 111, control is passed to step 608. Otherwise, if it is determined that the internal rechargeable power source lacks sufficient power to charge the input device 111, control is passed to step 610.

In step 608, a determination is made as to whether a rechargeable battery of the input device 111 is fully charged or not. That is, this step determines if the input device 111 needs to be charged. In an embodiment, this step comprises calculating a state of charge (SOC) for the rechargeable battery of the input device 111. The SOC of the rechargeable battery of the input device 111 can be calculated based on a percentage of available power as compared to the total energy storage capacity of the input device's 111 battery. In embodiments, the determination in step 608 is based at least in part on the calculated SOC value for the rechargeable battery of the input device 111 exceeding a certain, tunable threshold (i.e., 97%). If the SOC exceeds this threshold, the rechargeable battery is determined to be fully charged and control is passed to step 618 where method 600 ends. Otherwise, if it is determined that the rechargeable battery of the input device 111 is not fully charged, control is passed to step 614.

In optional step 610, the charging unit is connected to an external power source. As with steps 604 and 606, step 610 need not be performed, and in fact cannot be performed, if the method 600 is being carried out in an environment lacking any external power sources. In an embodiment, step 610 comprises connecting a conductive charging unit to an external power source 322 as described above with reference to FIG. 3. In an alternative embodiment, this step can comprise inductively coupling with an external, inductive power source 430 as described above with reference to FIG. 4. After the charging unit is connected to or coupled with an external power source, control is passed to step 612.

In optional step 612, the charging unit's internal rechargeable power source (i.e., an internal battery in the example of FIG. 6) is recharged. As noted above with regard to step 610, step 612 is not performed in situations where the method 600 is being carried out in an environment lacking any external power sources. Step 612 comprises recharging the unit's internal rechargeable power source from the external power source that the unit was connected to in step 610. After the internal rechargeable power source is recharged, control is passed to step 608 where it is determined if the input device 111 needs to be charged.

Next, in step 614, the rechargeable battery of the input device 111 is charged by the charging unit. In an embodiment, this step can comprise charging the input device 111 from the internal battery of the charging unit. Alternatively, step 614 can be performed by charging the input device 111 from an external power source connected to the charging unit via the port 106 and the power cable 218 as shown in FIGS. 1A and 3. After the input device 111 has been charged, control is passed to optional step 616.

In optional step 616, a charging and/or battery status is determined and indicated. According to embodiments, this step can comprise determining battery and charging statuses such as the exemplary statuses of fully charged, charging, not charging, and nearing depletion shown in FIG. 6. In certain embodiments, these exemplary statuses can be separately determined for one or both of the rechargeable battery of the input device 111 and the charging unit's internal battery. For example, as discussed above with regard to FIGS. 3-5, charging and battery statuses, such as, but not limited to, charging the input device 111, charging the internal rechargeable power source 108 of the charging unit (i.e., using an external power source 322), inductive coupling to an inductive power source 430, fully charged (either battery), substantially depleted (either battery), and not charging (either battery) can be determined. As discussed above with regard to FIGS. 3 and 5, in certain embodiments, once determined, a battery or charging status can be indicated via an LED 219 of the input device 111 and/or an LED 519 of the charging unit. For example, an LED can be illuminated in step 614 if the status is charging the input device 111, the LED can be pulsated when the status is charging the internal rechargeable power source 108 of the charging unit, and the LED can be turned off when the status is not charging (either battery). After the determined charging and/or battery status has been determined and indicated, control is passed to step 618 where the method ends.

In certain embodiments, (not shown), step 616 can be performed during execution of one or more of steps 612 and 614. For example, by performing step 616 in parallel with or as part of step 612, the charging and battery status for the charging unit's internal battery can be determined and displayed while the internal battery is being charged. Similarly, by executing step 616 during step 614, the charging and battery status for the input device 111 can be determined and displayed while the input device 111 is being charged.

Exemplary Computer System Implementation

Although exemplary embodiments have been described in terms of charging apparatuses, units, systems, and methods, it is contemplated that certain functionality described herein may be implemented in software on microprocessors, such as microprocessor chips included in the circuitry 226 shown in FIGS. 2C and 3, and computing devices such as the computer system 700 illustrated in FIG. 7. In various embodiments, one or more of the functions of the various components may be implemented in software that controls a computing device, such as computer system 700, which is described below with reference to FIG. 7.

Aspects of the present invention shown in FIGS. 1-6, or any part(s) or function(s) thereof, may be implemented using hardware, software modules, firmware, tangible computer readable media having logic or instructions stored thereon, or a combination thereof and may be implemented in one or more computer systems or other processing systems.

FIG. 7 illustrates an example computer system 700 in which embodiments of the present invention, or portions thereof, may be implemented as computer-readable instructions or code. For example, some functionality performed by the circuitry 226 of FIGS. 2C and 3, can be implemented in the computer system 700 using hardware, software, firmware, non-transitory computer readable media having instructions stored thereon, or a combination thereof and may be implemented in one or more computer systems or other processing systems. Hardware, software, or any combination of such may embody certain modules and components used to implement steps in the charging method 600 illustrated by the flowchart of FIG. 6 discussed above and the charging system discussed above with reference to FIGS. 1A-1C and 3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme.

Computer system 700 also includes a main memory 708, for example, random access memory (RAM), and may also include a secondary memory 710. Secondary memory 710 may include, for example, a hard disk drive 712, removable storage drive 714. Removable storage drive 714 may comprise a floppy disk drive, a magnetic tape drive, an optical disk drive, a flash memory, or the like.

The removable storage drive 714 reads from and/or writes to a removable storage unit 718 in a well known manner. Removable storage unit 718 may comprise a floppy disk, magnetic tape, optical disk, etc. which is read by and written to by removable storage drive 714. As will be appreciated by persons skilled in the relevant art, removable storage unit 718 includes a non-transitory computer readable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

As used herein the terms "computer readable medium" and "non-transitory computer readable medium" are used to generally refer to media such as memories, such as main memory 708 and secondary memory 710, which can be memory semiconductors (e.g., DRAMs, etc.). Computer readable medium and non-transitory computer readable medium can also refer to removable storage unit 718, removable storage unit 722, and a hard disk installed in hard disk drive 712. Signals carried over communications path 726 can also embody the logic described herein. These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement the present invention as discussed herein. In particular, the computer programs, when executed, enable processor device 704 to implement the processes of the present invention, such as the steps in the method 600 illustrated by the flowchart of FIG. 6, discussed above. Accordingly, such computer programs represent controllers of the computer system 700. Where the invention is implemented using software, the software may be stored in a computer program product and loaded into computer system 700 using removable storage drive 714, interface 720, and hard disk drive 712, or communications interface 724.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

General Considerations

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A mobile charging apparatus comprising:
   a sleeve portion adapted to receive an input device via a first opening at a first end of the sleeve portion, the sleeve portion having a second end presenting a second opening; and
   a base portion having a sleeve coupling end adapted for removable coupling to the second end of the sleeve portion, the second opening of the second end being configured to accommodate the sleeve coupling end when the base portion and sleeve portion are in a coupled configuration, the cavity comprising charging contacts coupled to a first rechargeable battery that is disposed within the base portion, the base portion being configured to:
   receive electrical power from an external power source to recharge the first rechargeable battery via an interface configured on the base portion; and
   charge a second rechargeable battery of the input device when the input device is removably secured to the cavity by transferring electrical power received from the external power source via an electrical connection between the charging contacts and charging zones of a conductive surface of the input device.

2. The apparatus of claim 1, wherein the cavity is adapted to receive an end of the input device including the charging zones, the cavity including a mechanical coupling mechanism configured to removably secure the end of the input device so that, when in a secured configuration:
   one of a positive charging contact and a negative charging contact of the base portion is in physical contact with one of a corresponding positive charging zone and a corresponding negative charging zone of the input stylus; and
   the other one of the positive charging contact and the negative charging contact of the base portion is in physical contact with the other one of the corresponding positive charging zone and the corresponding negative charging zone of the input stylus.

3. The apparatus of claim 1, wherein the charging contacts comprise:
   a first charging contact configured for electrical connection to one of a positive terminal and a negative terminal of the first rechargeable battery; and
   a second charging contact configured for electrical connection to the other one of the positive terminal and the negative terminal of the first rechargeable battery.

4. The apparatus of claim 1, wherein the input device is a stylus having a tip at an end of the stylus for interacting with a touch surface of a computing device, the conductive surface being proximate to the tip and being electrically isolated from a body of the stylus by an insulating ring disposed between the conductive surface and the body,
   wherein the sleeve portion is an elongate housing configured to receive the stylus through the first opening,
   and wherein the base portion includes a mechanical coupling mechanism configured to secure the stylus within the elongate housing so that the charging contacts are electrically connected to the charging zones of the stylus.

5. The apparatus of claim 1, wherein the interface is a Universal Serial Bus (USB) interface, and wherein the base portion comprises:
   a Micro USB receptacle configured to receive electrical power from the external power source via the USB interface;
   circuitry configured to convert the received electrical power to electric current having an amperage and voltage needed to charge the input device; and
   an electrical connection between the circuitry to the charging contacts.

6. The apparatus of claim 1, wherein first rechargeable battery is configured to:
   store electrical power received via the interface with the external power source, the first rechargeable battery having sufficient energy storage capacity to recharge the rechargeable battery of the input device a certain number of times without requiring electrical power from the external power source, and
   charge the rechargeable battery of the input device,
   the apparatus further comprising:
   a light emitting diode (LED); and
   a computer readable storage medium having stored thereon instructions, that when executed by a processor, cause the processor to indicate a status via the LED, wherein the status is one or more of charging the input device from the external power source, charging the input device from the first rechargeable battery, charging the first rechargeable battery from the external power source, the first rechargeable battery is fully charged, and not charging, wherein the logic comprises instructions to:
cycle the LED on and off so as to iteratively blink the LED when the status is charging the input device from the external power source,
alternate between partially and fully illuminating the LED so as to pulsate the LED when the status is charging the input device from the first rechargeable battery,
illuminate the LED at maximum brightness when the status is the first rechargeable battery is fully charged, and
turn off the LED when the status is not charging.

7. The apparatus of claim 1, wherein the input device comprises:
a light emitting diode (LED); and
a computer readable medium having logic stored thereon, that when executed by a processor, causes the processor indicate a status of the second rechargeable battery of the input device via the LED, wherein the status is one or more of charging, fully charged, substantially depleted, and not charging, and wherein the logic comprises instructions to:
alternate between partially and fully illuminating the LED so as to pulsate the LED when the status is charging,
cycle the LED on and off a predetermined number of iterations when the status is substantially depleted,
illuminate the LED at a maximum brightness when the status is fully charged, and
turn off the LED when the status is not charging.

8. The apparatus of claim 7, wherein the apparatus is configured so that the LED of the input device remains visible through one or more of the first opening, a transparent portion of the sleeve portion, and a translucent portion of the sleeve portion.

9. The apparatus of claim 1, the base portion comprising:
an induction coil configured to:
inductively couple to an inductive charging coil of the external power source,
receive energy wirelessly from the inductive charging coil in the form of electromagnetic waves,
convert the received energy to electrical current, and
wherein the first rechargeable battery is configured to:
receive the electrical current,
store energy corresponding to the received current, and
charge the second rechargeable battery of the input device.

10. The apparatus of claim 1, wherein the base portion comprises:
a light emitting diode (LED); and
circuitry having logic encoded thereon, that when executed by a processor, causes the processor to indicate a status via the LED, wherein the status is one or more of charging the input device, charging the first rechargeable battery of the apparatus, conductive coupling to the external power source, inductive coupling to the external power source, and not charging, wherein the logic comprises instructions to:
solidly illuminate the LED when the status is charging the second rechargeable battery of the input device;
pulsate the LED when the status is charging the first rechargeable battery of the apparatus;
turn off the LED when the status is not charging;
blink the LED when the status is conductive coupling to the external power source; and
pulsate the LED a predetermined number of times when the status is inductive coupling to the external power source.

11. The apparatus of claim 1, wherein the apparatus is adapted to protect a body and a tip of the received input device from external mechanical forces when the base portion and sleeve portion are in the coupled configuration.

12. A method for charging a rechargeable stylus, the method comprising:
detecting insertion of a stylus into a housing of a charging unit, the housing comprising a protective sleeve adapted to receive the stylus through a first open end, and a charging base portion having a protective sleeve coupling end for removable coupling to a second open end of the protective sleeve, the charging base portion having a first rechargeable battery and an interface configured to receive electrical power from an external power source, the housing being adapted to protect a body and a tip of the inserted stylus from external mechanical forces when the protective sleeve and the charging base portion are in a coupled configuration;
determining whether the charging unit is coupled to the external power source;
in response to determining that the charging unit is not coupled to the external power source, charging the second rechargeable battery of the inserted stylus utilizing the first rechargeable battery of the charging unit.

13. The method of claim 12, the charging unit including a light emitting diode (LED) and a computer readable storage medium having stored thereon, instructions, that when executed by a processor, cause the processor to indicate a status via the LED, wherein the status is one or more of charging the second rechargeable battery of the inserted stylus, conductively charging the internal battery of the charging unit, inductively charging the internal battery of the charging unit, and not charging, wherein the instructions comprise:
instructions for illuminating the LED when the status is charging the second rechargeable battery of the inserted stylus;
instructions for blinking the LED when the status is conductively charging the first rechargeable battery of the charging unit;
instructions for pulsating the LED a predetermined number of times when the status is inductively charging the first rechargeable battery of the charging unit; and
instructions for turning off the LED when the status is not charging.

14. A system for charging a stylus, the system comprising:
an external power source adapted to transmit electrical power via an interface; and
a charging unit comprising:
an elongate housing having a body portion and a base portion adapted to be removably coupled to the body portion, wherein at least the base portion presents an opening adapted to receive the stylus when the base portion and the body portion are in a decoupled configuration, the body portion and the base portion being adapted to encase a body and a tip of the received stylus for protection from external mechanical forces when in a coupled configuration,
a mechanical coupling mechanism adapted to secure the received stylus within the elongate housing,
charging contacts adapted to transfer electrical current via an electrical connection from one of a first rechargeable battery of the charging unit and the power source to charging zones of a conductive surface of the secured stylus;

wherein the charging unit is configured to:

detect the stylus received via the opening, receive electrical power from the external power source via the interface; and charge a second rechargeable battery of the secured stylus by transferring electrical power received from the external power source to the second rechargeable battery via an electrical connection between the charging contacts and the charging zones.

15. The apparatus of claim 11, wherein the sleeve portion and the base portion are each encased with one or more outer layers comprising shock absorbing materials.

16. The apparatus of claim 1, wherein each of the first opening and the second opening of the sleeve portion is substantially triangular.

17. The apparatus of claim 1, wherein the sleeve portion presents a translucent or transparent opening for maintained visibility of an LED configured on the received stylus.

18. The system of claim 14, wherein the charging unit is further configured to charge the first rechargeable battery of the charging unit, instead of the second rechargeable battery of the received stylus, with the electrical power received from the external power source based on a determination that the first rechargeable battery needs to be charged.

19. The system of claim 14, wherein the first rechargeable battery is disposed within the elongate housing.

20. The apparatus of claim 2, wherein the positive charging contact and the negative charging contact of the base portion are each disposed on opposing sides of the mechanical coupling mechanism.

* * * * *